(12) United States Patent
Jiang

(10) Patent No.: US 11,259,317 B2
(45) Date of Patent: Feb. 22, 2022

(54) SYSTEM MESSAGE RECEIVING METHOD AND SYSTEM MESSAGE RECEIVING DEVICE

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 143 days.

(21) Appl. No.: 16/499,112

(22) PCT Filed: Jun. 26, 2017

(86) PCT No.: PCT/CN2017/090092
§ 371 (c)(1),
(2) Date: Sep. 27, 2019

(87) PCT Pub. No.: WO2019/000191
PCT Pub. Date: Jan. 3, 2019

(65) Prior Publication Data
US 2021/0289528 A1    Sep. 16, 2021

(51) Int. Cl.
*H04W 72/12* (2009.01)
*H04W 76/19* (2018.01)
(Continued)

(52) U.S. Cl.
CPC ..... *H04W 72/1278* (2013.01); *H04W 72/005* (2013.01); *H04W 72/1263* (2013.01); *H04W 76/19* (2018.02); *H04W 52/0209* (2013.01)

(58) Field of Classification Search
CPC ........... H04W 72/1278; H04W 72/005; H04W 76/19; H04W 72/1263; H04W 52/0209
See application file for complete search history.

(56) References Cited

U.S. PATENT DOCUMENTS

| 6,628,946 B1 | 9/2003 | Wiberg et al. |
| 2010/0027466 A1 | 2/2010 | Mustapha |

(Continued)

FOREIGN PATENT DOCUMENTS

| CN | 101227706 A | 7/2008 |
| CN | 101523957 A | 9/2009 |

(Continued)

OTHER PUBLICATIONS

International Search Report in the International Application No. PCT/CN2017/090092, dated Jan. 25, 2018.
(Continued)

*Primary Examiner* — Charles C Jiang
*Assistant Examiner* — Shawn D Miller
(74) *Attorney, Agent, or Firm* — Finnegan, Henderson, Farabow, Garrett & Dunner, L.L.P.

(57) ABSTRACT

Disclosed is a system message receiving method, comprising: receiving a minimum system message transmitted by a base station; determining a scheduling state of first other system messages in other system messages according to first indication information; if all messages in the first other system messages are changed from being scheduled to not being scheduled, ending the process of requesting the first other system messages; and if some of the first other system messages are changed from being scheduled to not being scheduled, ending the process of requesting the first other system messages, and sending to the base station a request of obtaining some messages that are still scheduled in the first other system messages, alternatively, continuing the process of requesting the first other system messages, and sending, after the process of requesting the first other system messages is ended, to the base station the request for obtaining some messages that are still scheduled in the first other system messages. According to embodiments of the (Continued)

present invention, an appropriate operation may be executed and other system messages can be received in time when the scheduling situations of the other system messages are changed.

20 Claims, 17 Drawing Sheets

(51) Int. Cl.
*H04W 72/00* (2009.01)
*H04W 52/02* (2009.01)

(56) References Cited

U.S. PATENT DOCUMENTS

| | | | |
|---|---|---|---|
| 2017/0099664 A1 | 4/2017 | Lunttila et al. | |
| 2018/0199267 A1* | 7/2018 | Lin | H04W 48/10 |
| 2020/0236613 A1* | 7/2020 | Frenger | H04B 7/0617 |

FOREIGN PATENT DOCUMENTS

| | | | |
|---|---|---|---|
| CN | 106664660 A | 5/2017 | |
| CN | 106792998 A | 5/2017 | |
| CN | 106793000 A | 5/2017 | |
| CN | 106793139 A | 5/2017 | |
| EP | 1190582 A1 | 3/2002 | |

OTHER PUBLICATIONS

English translation of the Written Opinion of the International Search Authority in the International Application No. PCT/CN2017/090092, dated Jan. 25, 2018.

Extended European Search Report for Application No. 17916189.9, dated Oct. 15, 2020.

First Office Action in Chinese Application No. 201780000501.1, dated Aug. 27, 2020.

Huawei, "Further Considerations of Other SI", 3GPP TSG-RAN2 Meeting #96, R2-167580, Reno, Nevada, USA, Nov. 14-18, 2016.

Huawei, "Further considerations on Minimum SI", 3GPP TSG-RAN2 Meeting #96, R2-167579, Reno, Nevada, USA, Nov. 14-18, 2016.

Huawei, "Indications of On-Demand System Information", 3GPP TSG-RAN WG2 #97bis, R2-1702618, Spokane, USA, Apr. 3-7, 2017.

Catt, "On-demand system information delivery mechanism", 3GPP TSG-RAN WG2 Meeting #95bis, R2-166120, Kaohsiung, Oct. 10-14, 2016.

Etri, "Other SI scheduling information", 3GPP TSG-RAN WG2 Meeting #98, R2-1704536, Hangzhou, China, May 15-19, 2017.

InterDigital Communications, "Procedure for Request and Acquisition of Other—SI", 3GPP TSG-RAN WG2 Meeting #97bis, R2-1702877, Spokane, USA, Apr. 3-7, 2017.

* cited by examiner

SYSTEM MESSAGE RECEIVING METHOD AND SYSTEM MESSAGE RECEIVING DEVICE

CROSS REFERENCE TO RELATED APPLICATIONS

This application is a national phase application based on PCT/CN2017/090092, filed Jun. 26, 2017, the content of which is incorporated herein by reference.

TECHNICAL FIELD

The present disclosure generally relates to the technical field of terminals, and more particularly, to a method for receiving system information, a device for receiving system information, an electronic device and a computer-readable storage medium.

BACKGROUND

5th-Generation (5G) system information transmitted by a base station to user equipment includes minimum system information and other system information. The minimum system information is transmitted to the user equipment in a broadcast manner. Part of the other system information is transmitted to the user equipment in an on-demand manner, namely transmitted to the user equipment only after receiving a request from a user, and the other part of the system information is transmitted to the user equipment in the broadcast manner.

However, a scheduling condition (for example, scheduled or unscheduled) of the other system information, even the other system information itself and other factors may be changed under some circumstances. Therefore, in such case, if the user equipment continues to receive the other system information in an original manner, there may be brought the problems that the other system information may not be received and the like.

SUMMARY

The present disclosure provides a method for receiving system information, a device for receiving system information, an electronic device and a computer-readable storage medium, to overcome the shortcomings in a related art.

According to a first aspect of embodiments of the present disclosure, a method for receiving system information is provided, which may include that:

minimum system information transmitted by a base station is received, wherein the minimum system information includes first indication information;

a scheduling state of first other system information of other system information is determined according to the first indication information, wherein the first other system information is transmitted in an on-demand manner; and in a process of requesting the first other system information from the base station, if all information of the first other system information is changed from being scheduled to not being scheduled, the process of requesting the first other system information is ended;

or if part of the first other system information is changed from being scheduled to not being scheduled, the process of requesting the first other system information is ended and a request for acquiring part of information, that is still scheduled, of the first other system information is sent to the base station; or the process of requesting the first other system information is continued, and a request for acquiring part of information, that is still scheduled, of the first other system information is sent to the base station after the process of requesting the first other system information is finished.

Optionally, the method may further include that:

in a process of receiving the first other system information, if all the information of the first other system information is changed from being scheduled to not being scheduled, the first other system information is stopped to be received; or if part of the first other system information is changed from being scheduled to not being scheduled, part of information that is still scheduled is received.

Optionally, the minimum system information may further include second indication information, and the method may further include that:

whether the first other system information is in a transmitted state or not is determined according to the second indication information; and in the process of requesting the first other system information of the other system information from the base station, if all the information of the first other system information is in the transmitted state, the process of requesting the first other system information is ended and the first other system information is received within a time window when the first other system information is transmitted, or if part of the first other system information is in the transmitted state, the process of requesting the first other system information is ended and a request for acquiring part of information in an un-transmitted state is sent to the base station, or the process of requesting the first other system information is continued, and a request for acquiring part of information in the un-transmitted state is sent to the base station after the process of requesting the first other system information is finished.

Optionally, the minimum system information may further include third indication information, and the method may further include that:

whether the on-demand transmission manner is changed to a broadcast transmission manner for the first other system information or not and whether second other system information for which the broadcast transmission manner is changed to the on-demand transmission manner exists in the other system information or not are determined according to the third indication information;

if the on-demand transmission manner is changed to the broadcast transmission manner for the first other system information, the first other system information is received within a time window when the first other system information is transmitted in the broadcast transmission manner;

if the second other system information for which the broadcast transmission manner is changed to the on-demand transmission manner exists, whether the second other system information has been received or not is queried; and if no second other system information is received, a request for acquiring the second other system information is sent to the base station.

Optionally, the method may further include that:

in the process of requesting the first other system information of the other system information from the base station, if it is determined according to the first indication information that third other system information of the other system information is changed from not being scheduled to being scheduled, a transmission manner for the third other system information is determined according to the third indication information; and if the transmission manner for the third other system information is the on-demand manner, the process of requesting the first other system information is ended and a request for acquiring the first other system information and the third other system information is sent to the base station; or the process of requesting the first other system information is continued, and a request for acquiring the third other system information is sent to the base station after the process of requesting the first other system information is finished.

Optionally, the minimum system information may further include fourth indication information, and the method may further include that:

whether a content of the first other system information is changed or not is determined according to the fourth indication information;

if the content of the first other system information is changed, whether the changed first other system information has been received or not is queried; and if no changed first other system information is received, a request for acquiring the changed first other system information is sent to the base station.

Optionally, the method may further include that:

in the process of requesting the first other system information of the other system information from the base station, paging information is received, the paging information including fifth indication information;

whether a preamble of a Physical Random Access Channel (PRACH) and/or resource configuration information of the PRACH corresponding to the first other system information are/is changed or not is determined according to the fifth indication information; and if the preamble of the PRACH and/or the resource configuration information of the PRACH corresponding to the first other system information are/is changed, the first other system information is requested from the base station according to the changed preamble of the PRACH and/or the changed resource configuration information of the PRACH.

Optionally, the method may further include that:

in the process of requesting the first other system information of the other system information from the base station or in the process of receiving the first other system information, if paging information is received or network access instruction information exists in Non-Access Stratum (NAS) information, the process of requesting the first other system information or the process of receiving the first other system information is stopped; and a network access procedure is initiated according to the network access instruction information.

Optionally, the method may further include that:

the first other system information is received within the time window when the first other system information is transmitted;

if no first other system information is received within a preset number of successive time windows, whether the first other system information is essential information of the other system information or not is determined; and if the first other system information is essential information of the other system information, it is determined that a cell corresponding to the base station is disabled; or if the first other system information is unessential information of the other system information, a request for acquiring the first other system information is resent to the base station, or a communication connection is established with the base station to acquire the first other system information.

Optionally, the method may further include that:

a number of times for which the first other system information is re-quested from the base station is recorded; and in case that the number of times is higher than a first preset number of times, re-requesting the first other system information is stopped, and a communication connection is established with the base station to acquire the first other system information.

Optionally, the method may further include that:

in the process of requesting the first other system information from the base station, if indication information, which is transmitted via a physical layer, about a random access problem is received, the process of requesting the first other system information is ended, and the first other system information is re-requested from the based station after a preset time.

Optionally, the method may further include that:

the number of times for which the first other system information is re-requesting from the base station is recorded; and in case that the number of times is higher than a second preset number of times, re-requesting the first other system information is stopped, and the communication connection is established with the base station to acquire the first other system information.

According to a second aspect of the embodiments of the present disclosure, a device for receiving system information is provided, which may include:

a receiving module, configured to receive minimum system information transmitted by a base station, wherein the minimum system information includes first indication information;

a scheduling determination module, configured to determine a scheduling state of first other system information of other system information according to the first indication information, wherein the first other system information is transmitted in an on-demand manner; and a request control module, configured to, in a process of requesting the first other system information from the base station, if all information of the first other system information is changed from being scheduled to not being scheduled, end the process of requesting the first other system information; or if part of the first other system information is changed from being scheduled to not being scheduled, end the process of requesting the first other system information and send to the base station a request for acquiring part of information, that is still scheduled, of the first other system information; or continue the process of requesting the first other system information and send, after the process of requesting the first other system information is finished, to the base station a request for acquiring part of information, that is still scheduled, of the first other system information.

Optionally, the device may further include:

a reception control module, configured to, in a process of receiving the first other system information, if all the information of the first other system information is changed from being scheduled to not being scheduled, stop receiving the first other system information; or if part of the first other system information is changed from being scheduled to not being scheduled, receive part of information that is still scheduled.

Optionally, the minimum system information may further include second indication information, and the device may further include:

a transmission determination module, configured to determine whether the first other system information is in a transmitted state or not according to the second indication information, wherein the request control module may further be configured to, in the process of requesting the first other system information of the other system information from the base station, if all the information of the first other system information is in the transmitted state, end the process of requesting the first other system information and receive the first other system information within a time window when the first other system information is transmitted, or if part of the first other system information is in the transmitted state, end the process of requesting the first other system information and send a request for acquiring part of information in an un-transmitted state to the base station; or continue the process of requesting the first other system information and send, after the process of requesting the first other system information is finished, to the base station a request for acquiring part of information in the un-transmitted state.

Optionally, the minimum system information may further include third indication information, and the device may further include:

a manner determination module, configured to determine, according to the third indication information, whether the on-demand transmission manner is changed to a broadcast transmission manner for the first other system information or not, and whether second other system information for which the broadcast transmission manner is changed to the on-demand transmission manner exists in the other system information or not, wherein the receiving module may further configured to, if the on-demand transmission manner is changed to the broadcast transmission manner for the first other system information, receive the first other system information within a time window when the first other system information is transmitted in the broadcast transmission manner; and a first query module, configured to, if the second other system information for which the broadcast transmission manner is changed to the on-demand transmission manner exists, query whether the second other system information has been received or not, wherein the request control module may further configured to, in case that no second other system information is received, send to the base station a request for acquiring the second other system information.

Optionally, the manner determination module may further be configured to, in the process of requesting the first other system information of the other system information from the base station, if it is determined according to the first indication information that third other system information of the other system information is changed from not being scheduled to being scheduled, determine a transmission manner for the third other system information according to the third indication information; and the request control module may further be configured to, if the transmission manner for the third other system information is the on-demand manner, end the process of requesting the first other system information, and send to the base station a request for acquiring the first other system information and the third other system information, or continue the process of requesting the first other system information and send, after the process of requesting the first other system information is finished, to the base station a request for acquiring the third other system information.

Optionally, the minimum system information may further include fourth indication information, and the device may further include:

a content determination module, configured to determine whether a content of the first other system information is changed or not according to the fourth indication information; and a second query module, configured to, if the content of the first other system information is changed, query whether the changed first other system information has been received or not, wherein the request control module may further be configured to, in case that no changed first other system information is received, send to the base station a request for acquiring the changed first other system information.

Optionally, the device may further include:

a paging receiving module, configured to, in the process of requesting the first other system information of the other system information from the base station, receive paging information, the paging information including fifth indication information; and a channel determination module, configured to determine whether a preamble of a PRACH and/or resource configuration information of the PRACH corresponding to the first other system information are/is changed or not according to the fifth indication information, wherein the request control module may further be configured to, in case that the preamble of the PRACH and/or the resource configuration information of the PRACH corresponding to the first other system information are/is changed, request the first other system information from the base station according to the changed preamble of the PRACH and/or the changed resource configuration information of the PRACH.

Optionally, the device may further include:

an access determination module, configured to, in the process of requesting the first other system information of the other system information from the base station or in the process of receiving the first other system information, if paging information is received or network access instruction information exists in NAS information, stop the process of requesting the first other system information or the process of receiving the first other system information; and an access control module, configured to initiate a network access procedure according to the network access instruction information.

Optionally, the receiving module may further be configured to receive the first other system information within the time window when the first other system information is transmitted, and the device may further include:

an information determination module, configured to, if no first other system information is received within a preset number of successive time windows, determine whether the first other system information is essential information of the other system information or not; and a cell determination module, configured to, if the first other system information is essential information of the other system information, determine that a cell corresponding to the base station is disabled, and wherein the request control module may further be configured to, in case that the first other system information is unessential information of the other system information, resend to the base station a request for acquiring the first other system information, or establish a communication connection with the base station to acquire the first other system information.

Optionally, the device may further include:

a first recording module, configured to record a number of times for which the first other system information is re-requested from the base station, wherein the request control module may further be configured to, in case that the number of times is higher than a first preset number of times, stop re-requesting the first other system information and establish a communication connection with the base station to acquire the first other system information.

Optionally, the device may further include:

a problem determination module, configured to, in the process of requesting the first other system information from the base station, if indication information, which is transmitted via a physical layer, about a random access problem is received, end the process of requesting the first other system information and re-request the first other system information from the base station after a preset time.

Optionally, the device may further include:

a second recording module, configured to record the number of times for which the first other system information is re-requested from the base station, wherein the request control module may further be configured to, in case that the number of times is higher than a second preset number of times, stop re-requesting the first other system information and establish a communication connection with the base station to acquire the first other system information.

According to a third aspect of the embodiments of the present disclosure, an electronic device is provided, which may include:

a processor; and a memory configured to store an instruction executable for the processor, wherein the processor may be configured to:

receive minimum system information transmitted by a base station, the minimum system information including first indication information;

determine a scheduling state of first other system information of other system information according to the first indication information, the first other system information being transmitted in an on-demand manner; and in a process of requesting the first other system information from the base station, if all information of the first other system information is changed from being scheduled to not being scheduled, end the process of requesting the first other system information; or if part of the first other system information is changed from being scheduled to not being scheduled, end the process of requesting the first other system information, and send to the base station a request for acquiring part of information, that is still scheduled, of the first other system information, or continue the process of requesting the first other system information and send, after the process of requesting the first other system information is finished, to the base station a request for acquiring part of information, that is still scheduled, of the first other system information.

According to a fourth aspect of the embodiments of the present disclosure, a computer-readable storage medium having stored a computer program is provided, when the program is executed by a processor, the computer-readable storage medium implements the following steps:

minimum system information transmitted by a base station is received, the minimum system information including first indication information;

a scheduling state of first other system information of other system information is determined according to the first indication information, the first other system information being transmitted in an on-demand manner; and in a process of requesting the first other system information from the base station, if all information of the first other system information is changed from being scheduled to not being scheduled, the process of requesting the first other system information is ended; or if part of the first other system information is changed from being scheduled to not being scheduled, the process of requesting the first other system information is ended, and a request for acquiring part of information, that is still scheduled, of the first other system information is sent to the base station, or the process of requesting the first other system information is continued and send, after the process of requesting the first other system information is finished, to the base station a request for acquiring part of information, that is still scheduled, of the first other system information is sent.

The technical solutions provided by the embodiments of the present disclosure may have the following beneficial effects.

It can be seen from the above embodiments that the present disclosure can perform a proper operations and timely receive the other system information when a scheduling condition of the other system information changes.

Specifically, in the process of requesting the first other system information of the other system information from the base station, if part of the first other system information is changed from being scheduled to not being scheduled, namely part of the first other system information is still in the scheduled state, the present request process may be ended, and then a request for acquiring part of information that is still scheduled is resent to the base station, so that there is no need for the base station to process requests twice respectively, and a data volume of requests which is processed by the base station may be reduced. The present request process may also be continued, and a request for acquiring part of information that is still scheduled is sent to the base station after the request process is finished, so that there is no need for the user equipment to interrupt the present request process, and thus operation execution steps of the user equipment may be reduced, and power consumption of the user equipment is reduced.

It is to be understood that the above general descriptions and detailed descriptions below are only exemplary and explanatory, and not intended to limit the present disclosure.

BRIEF DESCRIPTION OF THE DRAWINGS

In order to describe the technical solutions in the embodiments of the present application more clearly, the accompanying drawings required to be used for descriptions about the embodiments will be simply introduced below. It is apparent that the accompanying drawings described below are only some embodiments of the present application. Those of ordinary skill in the art may further obtain other accompanying drawings according to these accompanying drawings without creative work.

DETAILED DESCRIPTION

Exemplary embodiments will be described in detail herein, examples of which are illustrated in the accompanying drawings. The following description refers to the accompanying drawings in which the same numbers in different drawings represent the same or similar elements unless otherwise represented. The implementations described in the following exemplary embodiments do not represent all implementations consistent with the present disclosure. Instead, they are merely examples of apparatuses and methods consistent with aspects related to the present disclosure as recited in the appended claims.

Figure 1:
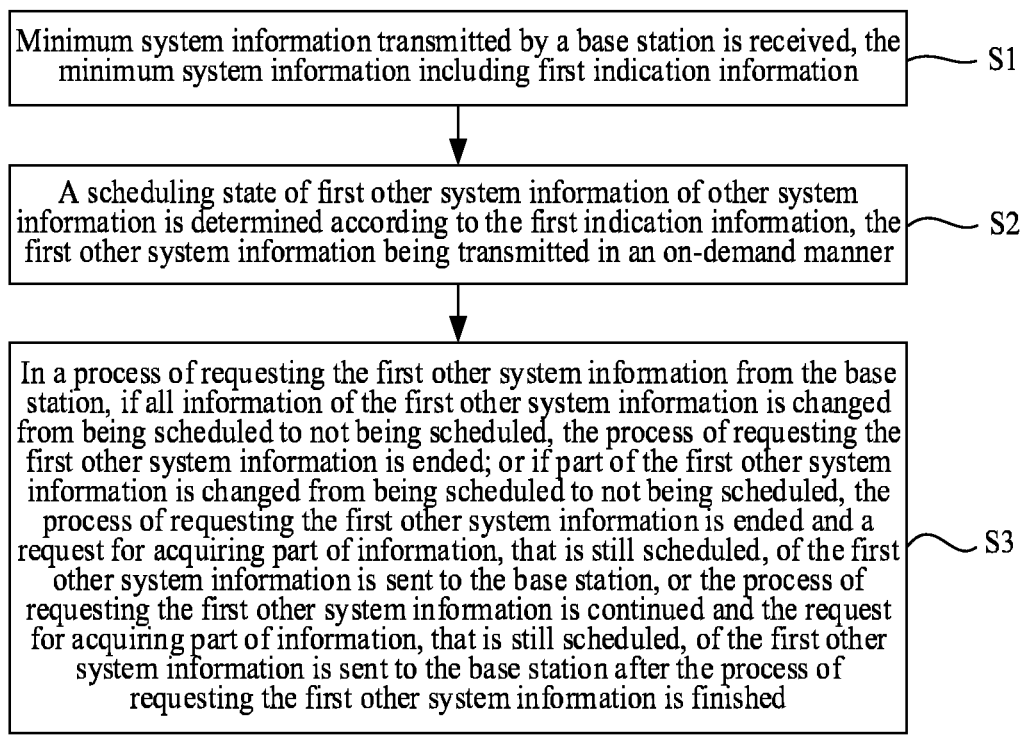
FIG. 1 is a schematic flow chart showing a method for receiving system information according to an exemplary embodiment.

FIG. 1 is a schematic flow chart showing a method for receiving system information according to an exemplary embodiment. The embodiment may be applied to user equipment, for example, user equipment receiving a 5G signal. As shown in FIG. 1, the method for receiving system information includes the following steps.

In block S1, minimum system information transmitted by a base station is received, herein the minimum system information includes first indication information.

In an embodiment, the base station transmitting the minimum system information may be a base station transmitting a 5G signal, and a transmission manner for system information thereof is different from a transmission manner for system information of a base station transmitting a 4th-Generation (4G) signal. The transmission manner for system information of the base station transmitting the 4G signal only includes a broadcast manner, and the base station transmitting the 5G signal may divide system information into minimum system information and other system information.

The minimum system information at least includes related information of cell selection and cell access, scheduling information of the other system information and the like, and thus is transmitted only in the broadcast manner. Part of the other system information may be transmitted to the user equipment in an on-demand manner, namely transmitted to the user equipment only after receiving a request from a user, and the other part of the system information is transmitted to the user equipment in the broadcast manner.

In block S2, a scheduling state of first other system information of other system information is determined according to the first indication information, herein the first other system information is transmitted in an on-demand manner.

In an embodiment, for some reasons, for example, setting information of the base station is changed, the scheduling state of the other system information (for example, the first other system information) transmitted in a certain manner may be changed, and if it is changed from being scheduled to not being scheduled, the user equipment may not receive the other system information; and if it is changed from not being scheduled to being scheduled, the user may receive the other system information.

For judging whether the scheduling state of the first other system information is changed or not, the user equipment may determine according to the first indication information of the minimum system information transmitted by the base station. For the first other system information transmitted in the on-demand manner, the user equipment is required to send a request for acquiring the first other system information to the base station, and the base station may transmit the first other system information only after receiving the request. The scheduling state of the first other system information may be changed in both processes that the user equipment requests the first other system information and receives the first other system information and the user equipment, after determining according to the first indication information that the scheduling state of the first other system information is changed in different processes, may execute different operations, which will specifically be described in blocks S3 and S4.

In block S3, in a process of requesting the first other system information from the base station, if all information of the first other system information is changed from being scheduled to not being scheduled, the process of requesting the first other system information is ended; or if part of the first other system information is changed from being scheduled to not being scheduled, the process of requesting the first other system information is ended, and a request for acquiring part of information, that is still scheduled, of the first other system information is sent to the base station, or the process of requesting the first other system information is continued, and the request for acquiring part of information, that is still scheduled, of the first other system information is sent to the base station after the process of requesting the first other system information is finished.

In an embodiment, the process of requesting the first other system information of the other system information from the base station refers to that the request for acquiring the first other system information has been sent to the base station but confirmation information (for confirming a request success or confirming a request failure) fed back by the base station according to the request has yet not been received.

In an embodiment, in the process of requesting the first other system information of the other system information from the base station, if it is determined according to the first indication information that all the information of the first other system information is changed from being scheduled to not being scheduled, any first other system information may not be received, so that the request process may directly be ended to reduce power consumption of the user equipment.

In an embodiment, in the process of requesting the first other system information of the other system information from the base station, if part of the first other system information is changed from being scheduled to not being scheduled, namely part of the first other system information is still in the scheduled state, the present request process may be ended, then a request for acquiring part of information that is still scheduled is resent to the base station, so that there is no need for the base station to process requests twice respectively, and a data volume of requests which is processed by the base station may be reduced. The present request process may also be continued, and a request for acquiring part of information that is still scheduled is sent to the base station after the request process is finished (namely the confirmation information fed back by the base station according to the request is received), so that there is no need for user equipment to interrupt the present request process, and thus operation execution steps of the user equipment may be reduced, and the power consumption of the user equipment is reduced.

Whether to end the present request process and resend to the base station a request for acquiring part of information that is still scheduled, or to continue the present request process and send, after the request process is finished, to the base station a request for acquiring part of information that is still scheduled, may specifically be set according to a requirement.

Figure 2:
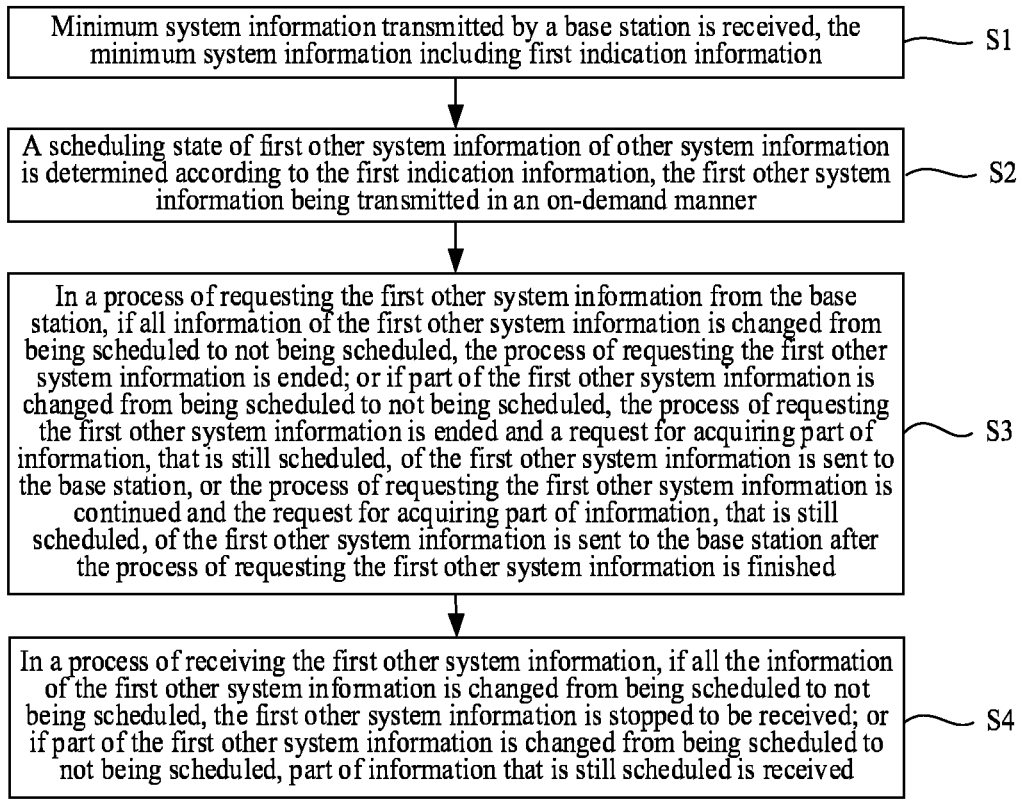
FIG. 2 is a schematic flow chart showing another method for receiving system information according to another exemplary embodiment.

FIG. 2 is a schematic flow chart showing another method for receiving system information according to an exemplary embodiment. As shown in FIG. 2, based on the embodiment shown in FIG. 1, the method further includes the following step.

In block S4, in a process of receiving the first other system information, if all the information of the first other system information is changed from being scheduled to not being scheduled, the first other system information is stopped to be received; or if part of the first other system information is changed from being scheduled to not being scheduled, part of information that is still scheduled is received.

In an embodiment, in the process of receiving the first other system information, if all the first other system information is changed from being scheduled to not being scheduled, any first other system information may not be received, so that the request process may directly be ended to reduce the power consumption of the user equipment.

In an embodiment, in the process of receiving the first other system information, if part of the first other system information is changed from being scheduled to not being scheduled, the first other system information changed to the unscheduled state may not be received anymore, and only the first other system information that is still scheduled is received, so that the request is not required to be resent to the base station, to receive as soon as possible the first other system information that is still scheduled.

Figure 3:
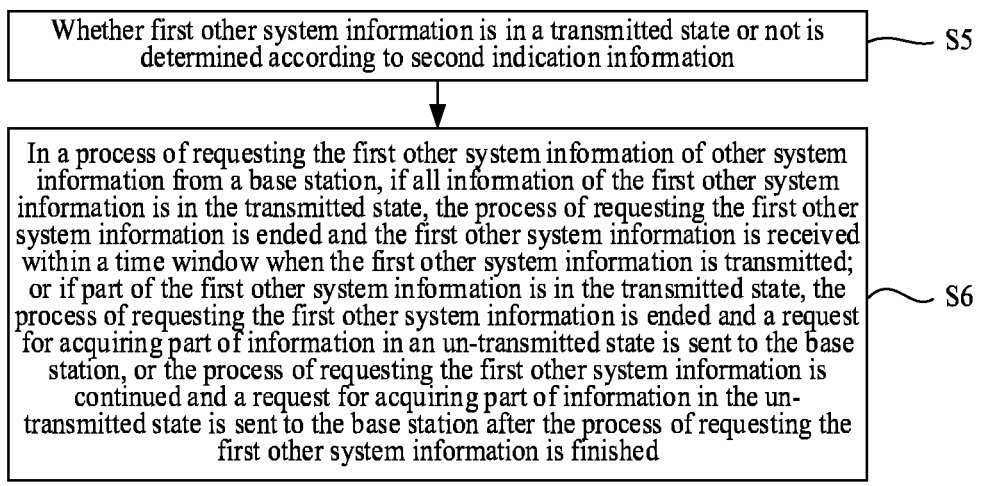
FIG. 3 is a schematic flow chart showing still another method for receiving system information, according to an exemplary embodiment.

FIG. 3 is a schematic flow chart showing another method for receiving system information according to an exemplary embodiment. As shown in FIG. 3, based on the embodiment shown in FIG. 1, the minimum system information further includes second indication information, and the method further includes the following steps.

In block S5, whether the first other system information is in a transmitted state or not is determined according to the second indication information.

In block S6, in the process of requesting the first other system information of the other system information from a base station, if all the information of the first other system information is in the transmitted state, the process of requesting the first other system information is ended, and the first other system information is received within a time window when the first other system information is transmitted, or if part of the first other system information is in the transmitted state, the process of requesting the first other system information is ended, and a request for acquiring part of information in an un-transmitted state is sent to the base station; or the process of requesting the first other system information is continued, and a request for acquiring part of information in the un-transmitted state is sent to the base station after the process of requesting the first other system information is finished.

In an embodiment, a time window corresponding to other system information transmitted by the base station in a certain manner is fixed, namely the base station transmits the other system information in the corresponding transmission manner within one or more time windows only. Moreover, for the first other system information transmitted in the on-demand manner, the base station, after receiving the request for the first other system information, may transmit it in the broadcast manner, namely not only transmitting it to the user equipment sending the request, but also transmitting it to all user equipment within a cell corresponding to the base station in the broadcast manner only after receiving the request.

In an embodiment, for some reasons, whether the first other system information is in the transmitted state or not may be changed. For example, for the first other system information that is not transmitted, if other user equipment requests the first other system information in advance, the first other system information is changed from the un-transmitted state to the transmitted state. Alternatively, whether the first other system information is in the transmitted state or not depends on the change in the configuration of the base station.

In an embodiment, in the process of requesting the first other system information from the base station, if it is determined according to the second indication information that all the first other system information is in the transmitted state, the process of requesting the first other system information is not required to be continued, and only the first other system information is received within the time window when the first other system information is transmitted, so that the power consumption of the user equipment may be reduced.

In an embodiment, in the process of requesting the first other system information from the base station, if it is determined according to the second indication information that part of the first other system information is in the transmitted state, the present request process may be ended, then a request for acquiring the first other system information in the un-transmitted state is resent to the base station, so that there is no need for the base station to process requests twice respectively, and the data volume of requests which is processed by the base station may be reduced. The present request process may also be continued, and a request for acquiring the first other system information in the un-transmitted state is sent to the base station after the request process is finished, so that there is no need for the user equipment to interrupt the present request process, and thus the operation execution steps of the user equipment may be reduced, and the power consumption of the user equipment is reduced.

Whether to end the present request process and resend to the base station a request for acquiring the first other system information in the un-transmitted state, or to continue the present request process and send, after the request process is finished, to the base station a request for acquiring the first other system information in the un-transmitted state, may specifically be set according to a requirement.

It is to be noted that S5 may be executed after S3 and an execution sequence may also be regulated according to a requirement as long as S5 is executed after S1.

Figure 4:
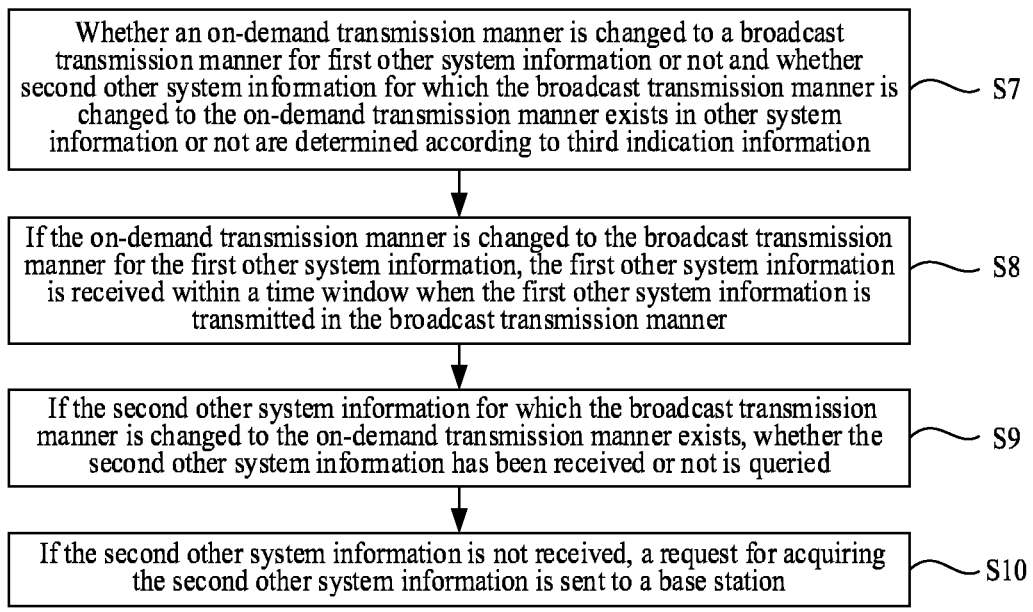
FIG. 4 is a schematic flow chart showing still another method for receiving system information according to an exemplary embodiment.

FIG. 4 is a schematic flow chart showing still another method for receiving system information according to an exemplary embodiment. As shown in FIG. 4, based on the embodiment shown in FIG. 1, the minimum system information further includes third indication information, and the method further includes the following steps.

In block S7, whether the on-demand transmission manner is changed to a broadcast transmission manner for the first other system information or not and whether second other system information for which the broadcast transmission manner is changed to the on-demand transmission manner exists in the other system information or not are determined according to the third indication information.

In block S8, if the on-demand transmission manner is changed to the broadcast transmission manner for the first other system information, the first other system information is received within a time window when the first other system information is transmitted in the broadcast transmission manner.

In an embodiment, if it is determined according to the third indication information that the on-demand transmission manner is changed to the broadcast transmission manner for the first other system information, namely the base station may broadcast the first other system information without waiting for receiving the request, so that the first other system information may directly be received within the time window when the first other system information is transmitted in the broadcast transmission manner, the user equipment is prevented from still sending the request to the base station, and the power consumption of the user equipment is reduced.

In block S9, if the second other system information for which the broadcast transmission manner is changed to the on-demand transmission manner exists, whether the second other system information has been received or not is queried.

In block S10, if the second other system information is not received, a request for acquiring the second other system information is sent to the base station.

In an embodiment, if it is determined according to the third indication information that the second other system information for which the broadcast transmission manner is changed to the on-demand transmission manner exists, in case that the second other system information has been received, the base station is not required to be requested for the second other system information, and only in case that the second other system information is not received, the request for acquiring the second other system information is required to be sent to the base station, so that the power consumption of the user equipment for sending the request to the base station is further reduced.

It is to be noted that S7 may be executed after S3 and the execution sequence may also be regulated according to the requirement as long as S7 is executed after S1.

Figure 5:
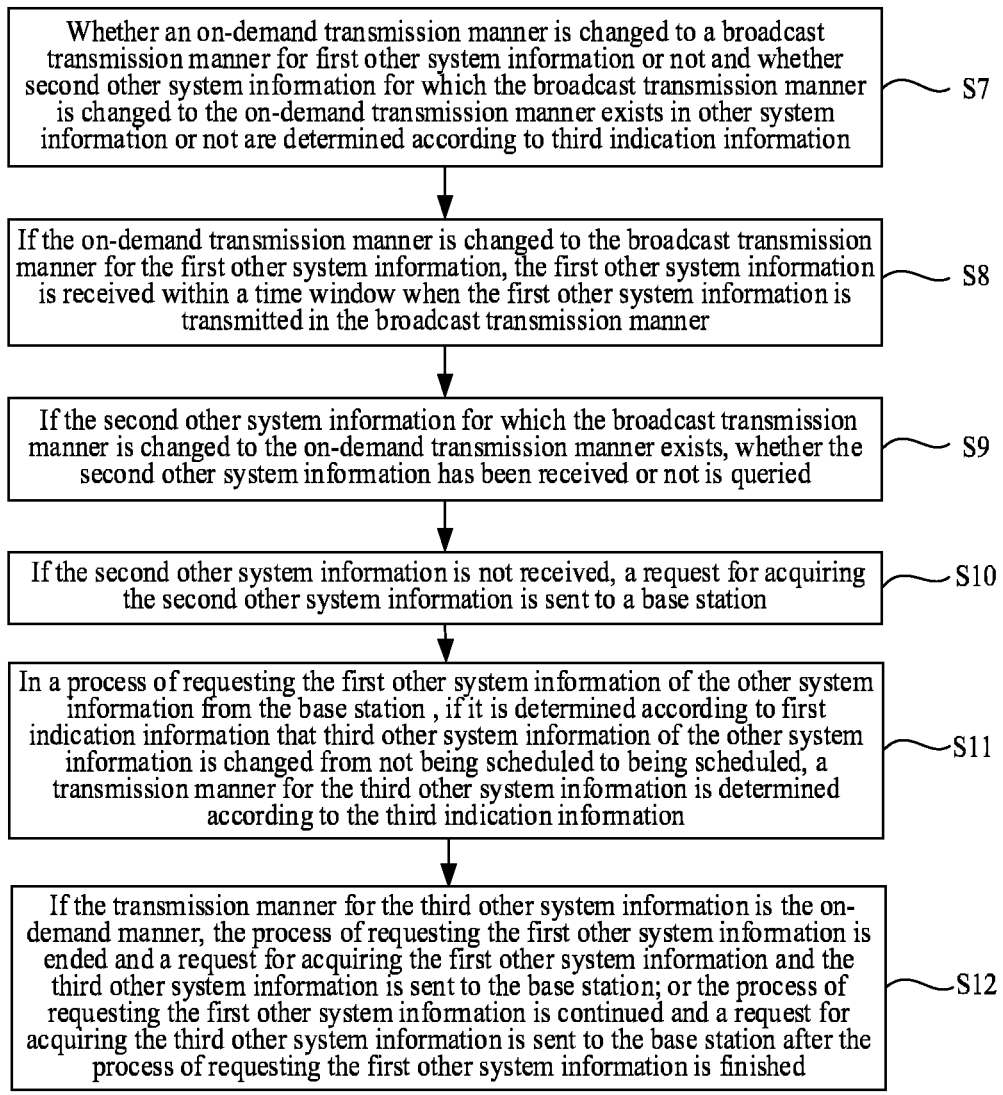
FIG. 5 is a schematic flow chart showing still another method for receiving system information according to an exemplary embodiment.

FIG. 5 is a schematic flow chart showing still another method for receiving system information according to an exemplary embodiment. As shown in FIG. 5, based on the embodiment shown in FIG. 4, the method for receiving system information further includes the following steps.

In block S11, in the process of requesting the first other system information of the other system information from the base station, if it is determined according to the first indication information that third other system information of the other system information is changed from not being scheduled to being scheduled, a transmission manner for the third other system information is determined according to the third indication information.

In block S12, if the transmission manner for the third other system information is the on-demand manner, the process of requesting the first other system information is ended and a request for acquiring the first other system information and the third other system information is sent to the base station, or the process of requesting the first other system information is continued, and a request for acquiring the third other system information is sent to the base station after the process of requesting the first other system information is finished.

In an embodiment, in the process of requesting the first other system information of the other system information from the base station, if there is new other system information that requires to be requested, namely the third other system information enters the scheduled state, the transmission manner for the third other system information may be determined according to the third indication information.

If the transmission manner for the third other system information is the broadcast transmission manner, the third other system information is only required to be received within a window corresponding to transmitting the third other system information in the broadcast manner.

If the transmission manner for the third other system information is the on-demand transmission manner, the present request process may be ended, and a request for acquiring the first other system information and the third other system information is sent to the base station, so that the base station is required to process the request only once, and the complexity of processing the request by the base station is reduced. The present request process may also be continued, and a request for acquiring the third other system information is sent to the base station after the process of requesting the first other system information is finished, so that there is no need for the user equipment to interrupt the present request process, and thus the operation execution steps of the user equipment may be reduced, and the power consumption of the user equipment is reduced.

Whether to end the present request process and send the request for acquiring the first other system information and the third other system information to the base station, or to continue the present request process and send, after the request process is finished, to the base station a request for acquiring the third other system information, may specifically be set according to a requirement.

Figure 6:
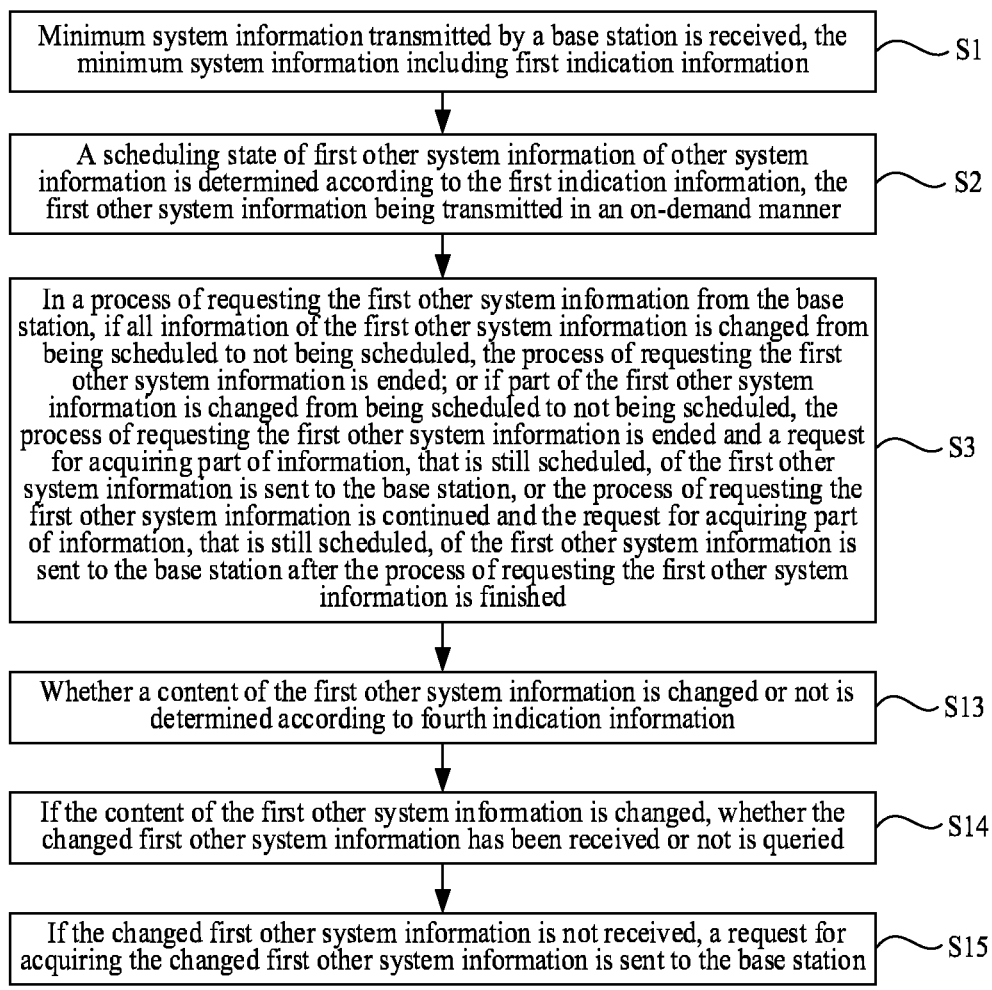
FIG. 6 is a schematic flow chart showing still another method for receiving system information according to an exemplary embodiment.

FIG. 6 is a schematic flow chart showing still another method for receiving system information according to an exemplary embodiment. As shown in FIG. 6, based on the embodiment shown in FIG. 1, the minimum system information further includes fourth indication information, and the method further includes the following steps.

In block S13, whether a content of the first other system information is changed or not is determined according to the fourth indication information.

In block S14, if the content of the first other system information is changed, whether the changed first other system information has been received or not is queried.

In block S15, if the changed first other system information is not received, a request for acquiring the changed first other system information is sent to the base station.

In an embodiment, for the first other system information of which the content is changed, the request for acquiring the changed first other system information may be sent to the base station in case that the first other system information is not received, so that the first other system information may be timely received. In case that the changed first other system information has been received, the request is not required to be sent anymore, so that the power consumption of the user equipment is reduced.

It is to be noted that S13 may be executed after S3 and the execution sequence may also be regulated according to the requirement as long as S13 is executed after S1.

Figure 7:
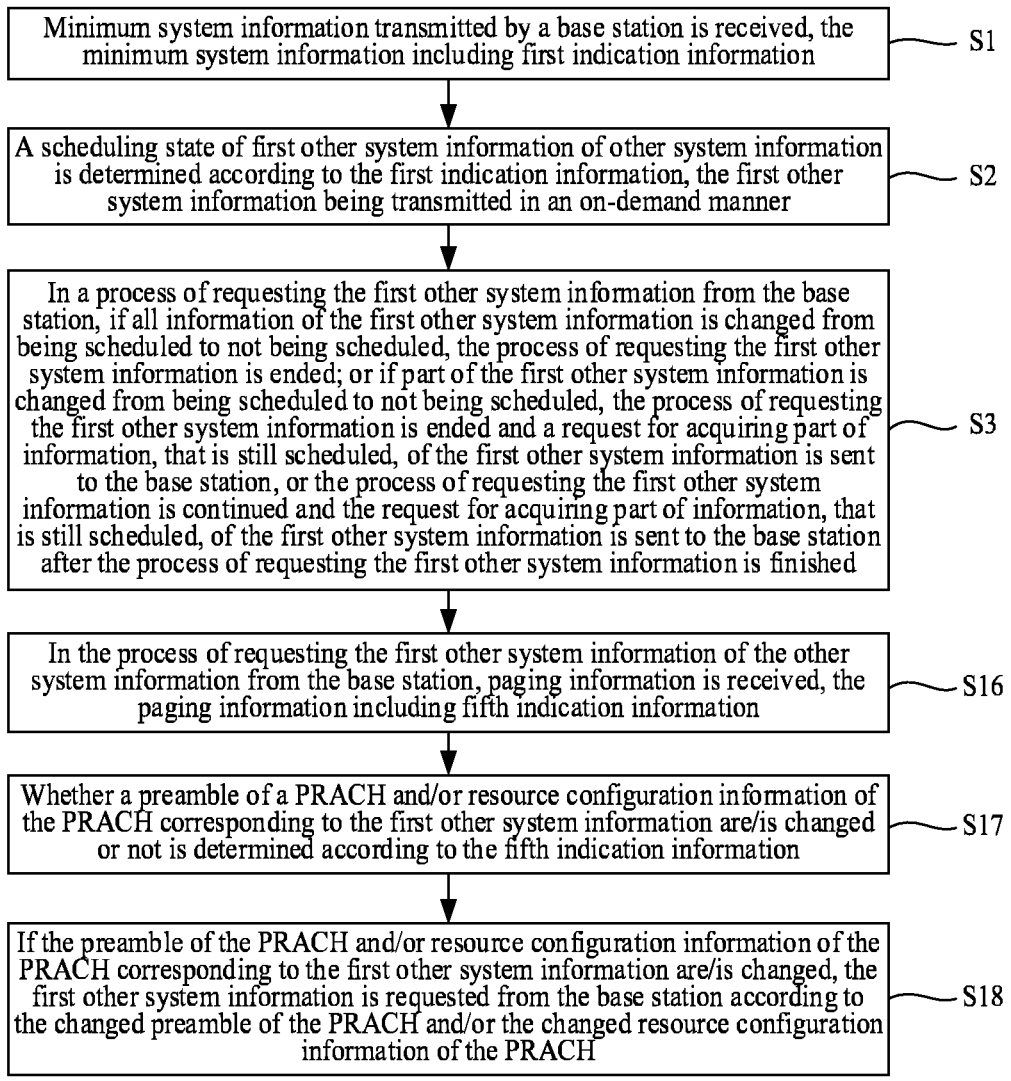
FIG. 7 is a schematic flow chart showing still another method for receiving system information according to an exemplary embodiment.

FIG. 7 is a schematic flow chart showing still another method for receiving system information according to an exemplary embodiment. As shown in FIG. 7, based on the embodiment shown in FIG. 1, the method for receiving system information further includes the following steps.

In block S16, in the process of requesting the first other system information of the other system information from the base station, paging information is received, the paging information including fifth indication information.

In block S17, whether a preamble of a PRACH and/or resource configuration information of the PRACH corresponding to the first other system information are/is changed or not is determined according to the fifth indication information.

In block S18, if the preamble of the PRACH and/or resource configuration information of the PRACH corresponding to the first other system information are/is changed, the first other system information is requested from the base station according to the changed preamble of the PRACH and/or resource configuration information of the PRACH.

In an embodiment, paging information may be used to indicate whether the preamble of the PRACH and/or the resource configuration information of the PRACH corresponding to the system information are/is changed or not. If the preamble of the PRACH and/or the resource configuration information of the PRACH corresponding to the system information are/is changed, the first other system information is requested from the base station according to the changed preamble of the PRACH and the changed resource configuration information of the PRACH, to ensure that the request may be smoothly transmitted to the base station.

It is to be noted that S16 may be executed after S3 and the execution sequence may also be regulated according to the requirement, for example, S16 is executed in a process of S3.

Figure 8:
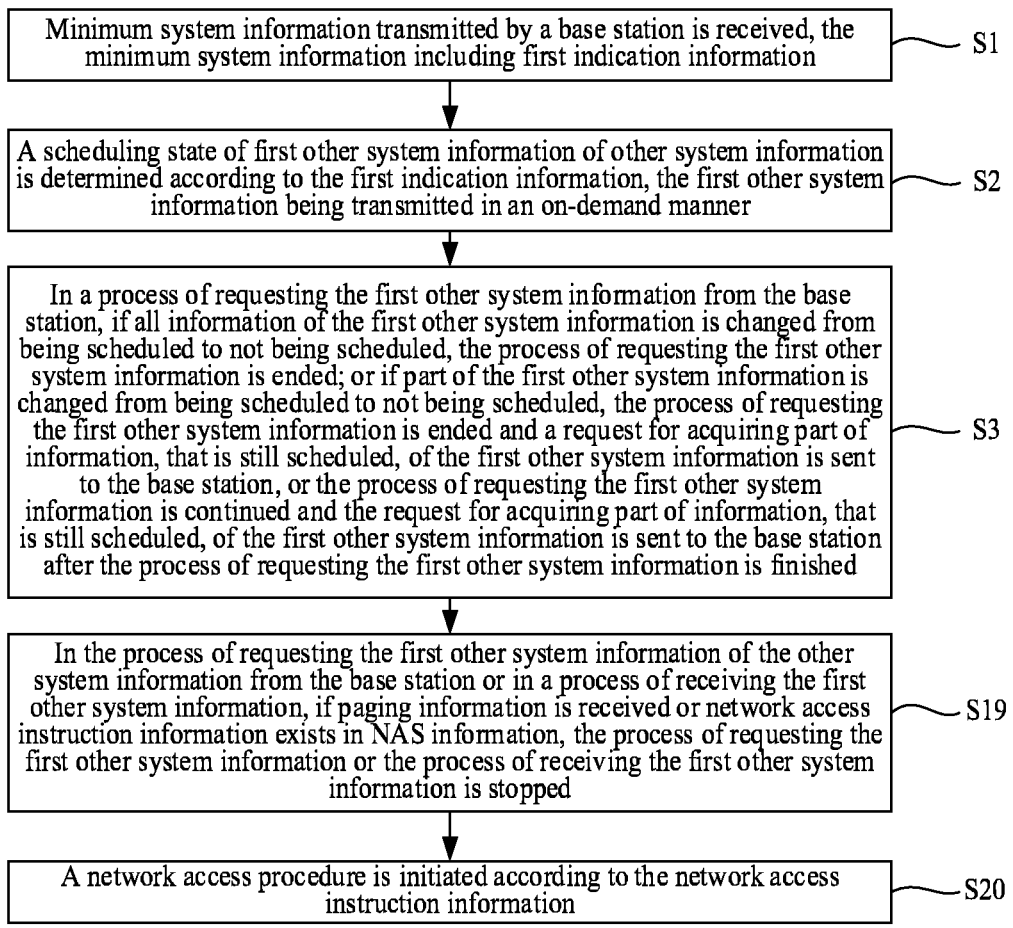
FIG. 8 is a schematic flow chart showing still another method for receiving system information according to an exemplary embodiment.

FIG. 8 is a schematic flow chart showing still another method for receiving system information according to an exemplary embodiment. As shown in FIG. 8, based on the embodiment shown in FIG. 1, the method for receiving system information further includes the following steps.

In block S19, in the process of requesting the first other system information of the other system information from the base station or in the process of receiving the first other system information, if paging information is received or network access instruction information exists in NAS information, the process of requesting the first other system information or the process of receiving the first other system information is stopped.

In block S20, a network access procedure is initiated according to the network access instruction information.

In an embodiment, in case that the user equipment changes the cell and the like, the paging information or the network access instruction information carried in the NAS information may be received to instruct the user equipment to access a new network, and in case that the new network is accessed, the base station corresponding to a network accessed by the user equipment before may not transmit the first other system information to the user equipment. Therefore, no matter whether the user equipment is in the process of requesting the first other system information of the other system information from the base station or in the process of receiving the first other system information, once such a change occurs, the present process is stopped, the network access procedure is prioritized, and after successfully accessing the network, the request is sent to a base station corresponding to the accessed network, to ensure that the user equipment may smoothly request for the first other system information.

It is to be noted that S19 may be executed after S3 and the execution sequence may also be regulated according to the requirement, for example, S19 is executed in the processes of S3 and/or S4.

Figure 9:
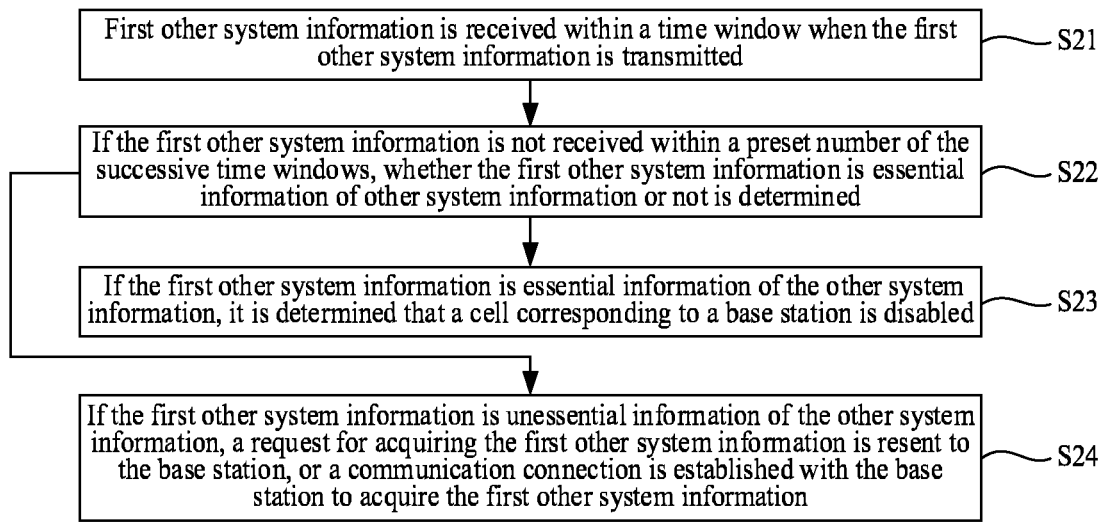
FIG. 9 is a schematic flow chart showing still another method for receiving system information according to an exemplary embodiment.

FIG. 9 is a schematic flow chart showing still another method for receiving system information according to an exemplary embodiment. As shown in FIG. 9, based on the embodiment shown in FIG. 1, the method for receiving system information further includes the following steps.

In block S21, the first other system information is received within the time window when the first other system information is transmitted.

In block S22, if the first other system information is not received within a preset number of successive time windows, whether the first other system information is essential information of the other system information or not is determined.

In block S23, if the first other system information is essential information of the other system information, it is determined that a cell corresponding to the base station is disabled.

In block S24, if the first other system information is unessential information of the other system information, a request for acquiring the first other system information is resent to the base station, or a communication connection is established with the base station to acquire the first other system information.

In an embodiment, since there exists a certain time interval for the user equipment receiving the minimum system information every time, second indication information of the last received minimum system information may be different from second indication information of the earlier received minimum system information, for example, whether the first other system information is in the transmitted state is changed.

For example, if the second indication information indicates that a transmission state of the first other system information is changed from the transmitted state to the un-transmitted state but the user equipment has yet not receive the changed first indication information, it may still be considered that the target other system information is in the transmitted state and is received within the corresponding time window. However, since the target other system information is in the un-transmitted state, the user equipment may not receive the target other system information within the corresponding time window.

Therefore, a preset number of time windows may be set to determine whether the transmission state of the first other system information is changed or not by confirming whether the user equipment may receive the first other system information within the preset number of time windows or not. For example, the preset number is 3, and then, if the target other system information is not received within latest 3 time windows, it may be determined that the transmission manner for the target other system information is changed to the un-transmission manner.

In an embodiment, the other system information may be divided into essential information and unessential information. The essential information includes a master system information block and a system information block, and the unessential information may be system information, except the minimum system information, the master system information block and the system information block, of the system information.

In an embodiment, if the first other system information un-received within the preset number of successive time windows is essential information, it may be determined that the cell corresponding to the base station transmitting the first other system information is disabled, so that the accessed cell may be changed.

In an embodiment, if the first other system information un-received within the preset number of successive time windows is unessential information, it may be determined that the cell corresponding to the base station transmitting the first other system information is still accessible, so that the request for acquiring the first other system information may be resent to the base station or the communication connection may be established with the base station to acquire the first other system information, to ensure that the first other system information may be smoothly acquired.

It is to be noted that S21 may be executed after S3 and the execution sequence may also be regulated according to the requirement, for example, S21 is executed in the process of S3.

Figure 10:
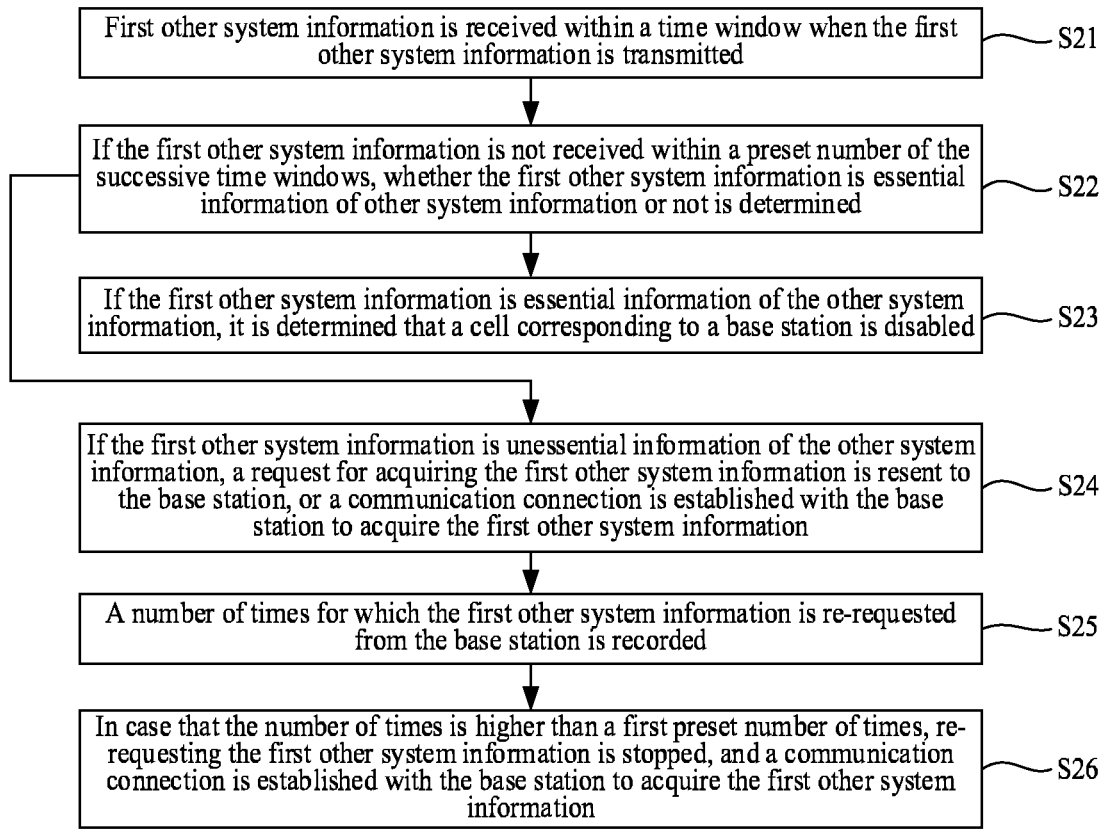
FIG. 10 is a schematic flow chart showing still another method for receiving system information according to an exemplary embodiment.

FIG. 10 is a schematic flow chart showing still another method for receiving system information, according to an exemplary embodiment. As shown in FIG. 10, based on the embodiment shown in FIG. 9, the method for receiving system information further includes the following steps.

In block S25, a number of times for which the first other system information is re-requested from the base station is recorded.

In block S26, in case that the number of times is higher than a first preset number of times, re-requesting the first other system information is stopped, and a communication connection is established with the base station to acquire the first other system information.

In an embodiment, if the first other system information un-received within the preset number of successive time windows is unessential information, the request for acquiring the first other system information may be resent to the base station. However, if the number of times for which the first other system information is re-requested is relatively high, namely higher than the first preset number of times (which may be set according to a requirement), it may be determined that there is a problem for transmission of the system information by the base station (for example, the system information may not be broadcast), and the communication connection may be established with the base station to ensure that the first other system information may be smoothly acquired.

Figure 11:
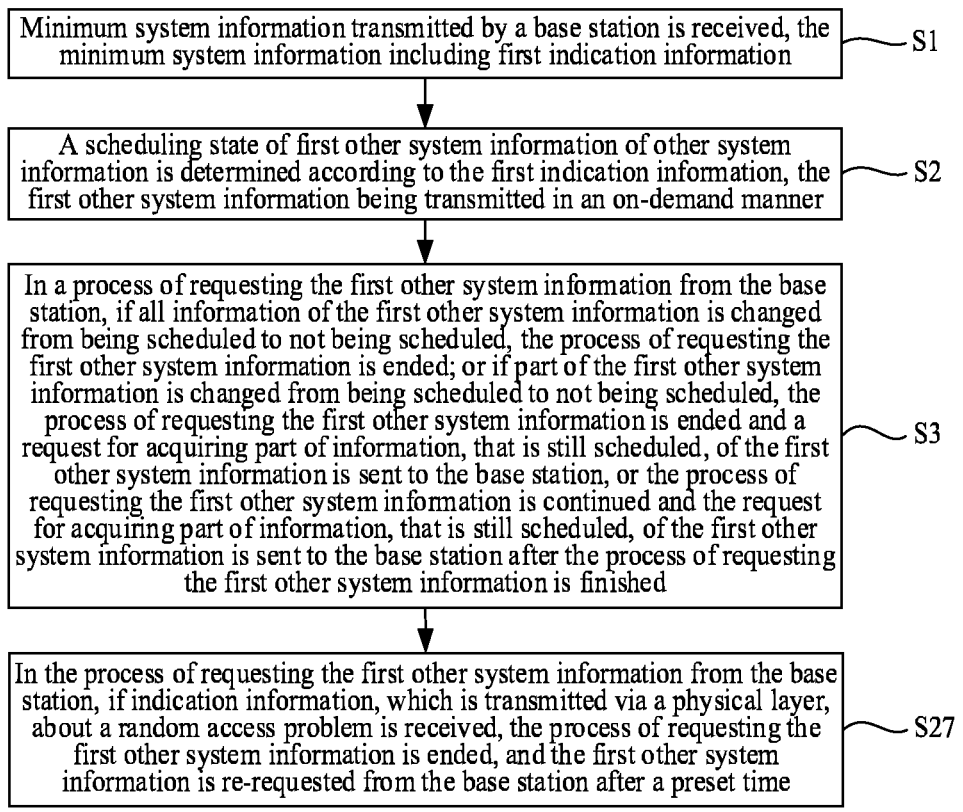
FIG. 11 is a schematic flow chart showing still another method for receiving system information according to an exemplary embodiment.

FIG. 11 is a schematic flow chart showing still another method for receiving system information according to an exemplary embodiment. As shown in FIG. 11, based on the embodiment shown in FIG. 1, the method for receiving system information further includes the following step.

In block S27, in the process of requesting the first other system information from the base station, if indication information, which is transmitted via a physical layer, about a random access problem is received, the process of requesting the first other system information is ended, and the first other system information is re-requested from the base station after a preset time.

In an embodiment, the user equipment transmits the request for acquiring the first other system information to the base station mainly through a Message 1 (MSG1) and/or an MSG3. In the process of requesting the first other system information from the base station, if the indication information, which is transmitted via a physical layer, about the random access problem is received, the user equipment may not transmit the request for acquiring the first other system information to the base station through the MSG1 and/or the MSG3 during the random access problem, so that the user equipment may be set to wait for the preset time (which may be set according to a requirement) and then transmit the request for acquiring the first other system information to the base station through the MSG1 and/or the MSG3, to ensure that the request may be smoothly transmitted to the base station.

It is to be noted that S27 may be executed after S4 and the execution sequence may also be regulated according to the requirement, for example, S27 is executed in the process of S3.

Figure 12:
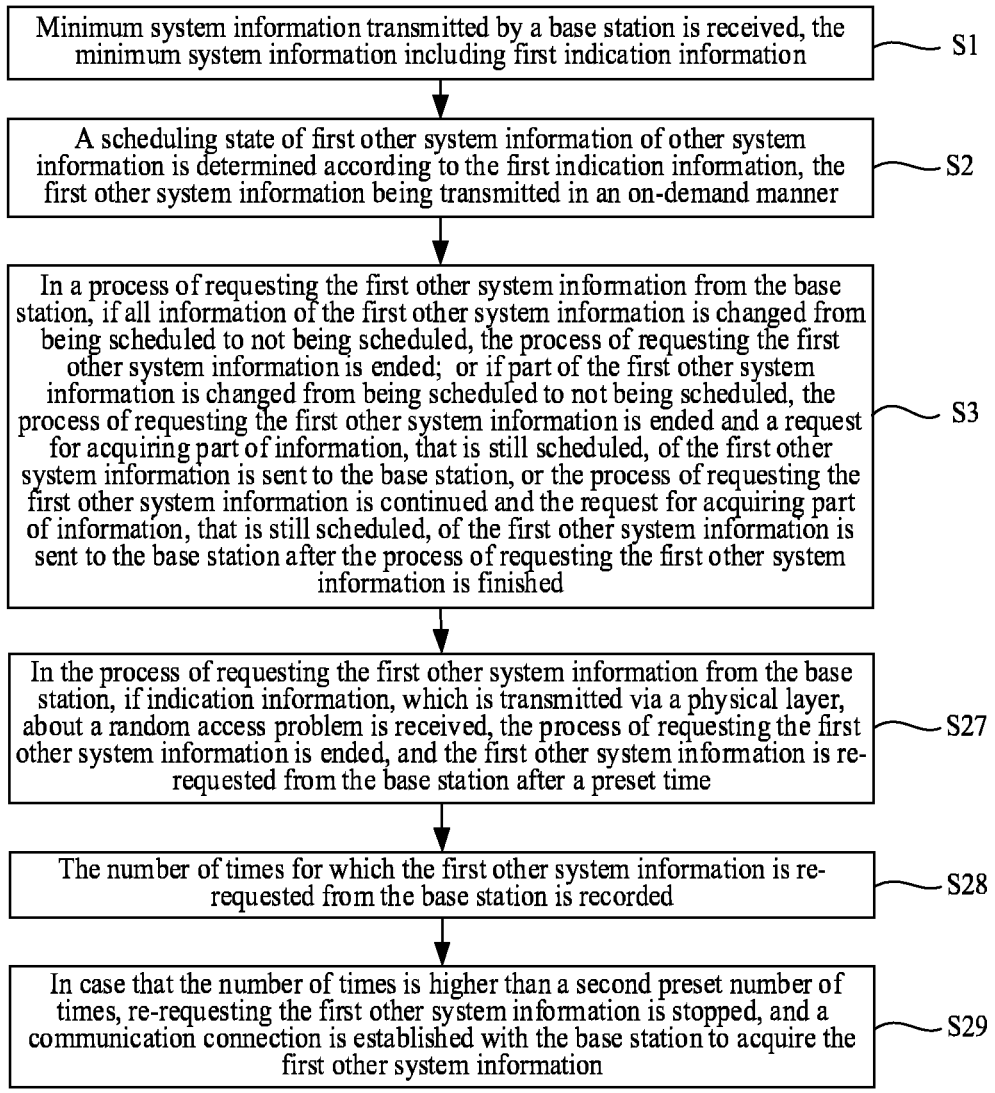
FIG. 12 is a schematic flow chart showing still another method for receiving system information according to an exemplary embodiment.

FIG. 12 is a schematic flow chart showing still another method for receiving system information according to an exemplary embodiment. As shown in FIG. 12, based on the embodiment shown in FIG. 11, the method for receiving system information further includes the following steps.

In block S28, the number of times for which the first other system information is re-requested from the base station is recorded.

In block S29, in case that the number of times is higher than a second preset number of times, re-requesting the first other system information is stopped, and a communication connection is established with the base station to acquire the first other system information.

In an embodiment, if the request for acquiring the first other system information is resent to the base station after waiting for the preset time, the request for acquiring the first other system information may be resent to the base station. However, if the number of times for which the first other system information is re-requested is relatively high, namely higher than the second preset number of times (which may be set according to a requirement), it may be determined that the random access problem still exists or there is a problem for transmission of the system information by the base station, for example, the system information may not be broadcast, and a communication connection may be established with the base station to ensure that the first other system information may be smoothly acquired.

Corresponding to the embodiments of the methods for receiving system information, the present disclosure also provides embodiments of a device for receiving system information.

Figure 13:
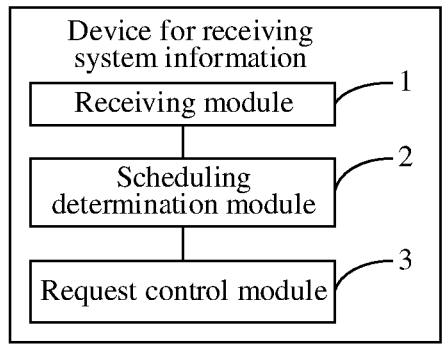
FIG. 13 is a schematic block diagram of a device for receiving system information according to an exemplary embodiment.

FIG. 13 is a schematic block diagram of a device for receiving system information according to an exemplary embodiment. Referring to FIG. 13, the device includes:

a receiving module 1, configured to receive minimum system information transmitted by a base station, the minimum system information including first indication information;

a scheduling determination module 2, configured to determine a scheduling state of first other system information of other system information according to the first indication information, the first other system information being transmitted in an on-demand manner; and a request control module 3, configured to, in a process of requesting the first other system information from the base station, if all information of the first other system information is changed from being scheduled to not being scheduled, end the process of requesting the first other system information; or if part of the first other system information is changed from being scheduled to not being scheduled, end the process of requesting the first other system information and send to the base station a request for acquiring part of information, that is still scheduled, of the first other system information, or continue the process of requesting the first other system information and send, after the process of requesting the first other system information is finished, to the base station a request for acquiring part of information, that is still scheduled, of the first other system information.

Figure 14:
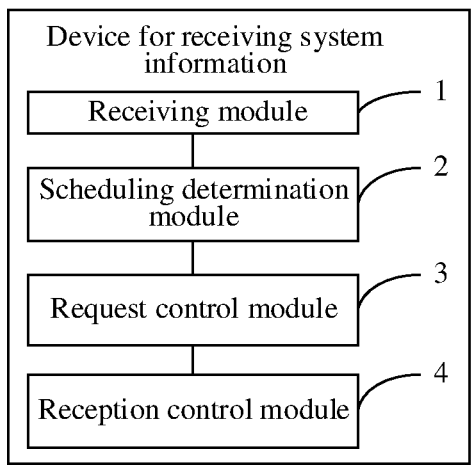
FIG. 14 is a schematic block diagram of another device for receiving system information according to an exemplary embodiment.

FIG. 14 is a schematic block diagram of another device for receiving system information according to an exemplary embodiment. As shown in FIG. 14, based on the embodiment shown in FIG. 13, the device further includes:

a reception control module 4, configured to, in a process of receiving the first other system information, if all the information of the first other system information is changed from being scheduled to not being scheduled, stop receiving the first other system information; or if part of the first other system information is changed from being scheduled to not being scheduled, receive part of information that is still scheduled.

Figure 15:
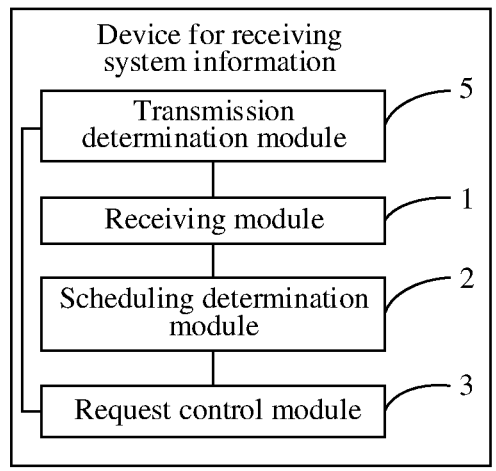
FIG. 15 is a schematic block diagram of still another device for receiving system information according to an exemplary embodiment.

FIG. 15 is a schematic block diagram of another device for receiving system information according to an exemplary embodiment. As shown in FIG. 15, based on the embodiment shown in FIG. 13, the minimum system information further includes second indication information, and the device further includes:

a transmission determination module 5, configured to determine whether the first other system information is in a transmitted state or not according to the second indication information.

The request control module 3 is further configured to, in the process of requesting the first other system information of the other system information from the base station, if all the information of the first other system information is in the transmitted state, end the process of requesting the first other system information and receive the first other system information within a time window when the first other system information is transmitted, or if part of the first other system information is in the transmitted state, end the process of requesting the first other system information and send to the base station a request for acquiring part of information in an un-transmitted state, or continue the process of requesting the first other system information and send, after the process of requesting the first other system information is finished, to the base station a request for acquiring part of information in the un-transmitted state.

Figure 16:
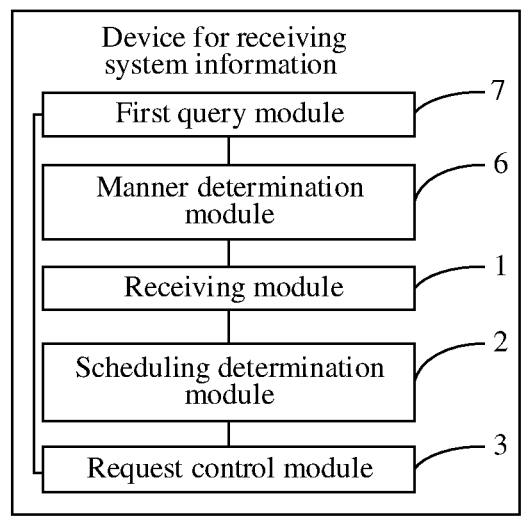
FIG. 16 is a schematic block diagram of still another device for receiving system information according to an exemplary embodiment.

FIG. 16 is a schematic block diagram of still another device for receiving system information according to an exemplary embodiment. As shown in FIG. 16, based on the embodiment shown in FIG. 13, the minimum system information further includes third indication information, and the device further includes:

a manner determination module 6, configured to determine, according to the third indication information, whether the on-demand transmission manner is changed to a broadcast transmission manner for the first other system information or not, and whether second other system information for which the broadcast transmission manner is changed to the on-demand transmission manner exists in the other system information or not, the receiving module is further configured to, if the on-demand transmission manner is changed to the broadcast transmission manner for the first other system information, receive the first other system information within a time window when the first other system information is transmitted in the broadcast transmission manner; and a first query module 7, configured to, if the second other system information for which the broadcast transmission manner is changed to the on-demand transmission manner exists, query whether the second other system information has been received or not, the request control module 3 is further configured to, in case that the second other system information is not received, send a request for acquiring the second other system information to the base station.

Optionally, the manner determination module is further configured to, in the process of requesting the first other system information of the other system information from the base station, if it is determined according to the first indication information that third other system information of the other system information is changed from not being scheduled to being scheduled, determine a transmission manner for the third other system information according to the third indication information.

The request control module is further configured to, if the transmission manner for the third other system information is the on-demand manner, end the process of requesting the first other system information and send to the base station a request for acquiring the first other system information and the third other system information, or continue the process of requesting the first other system information and send, after the process of requesting the first other system information is finished, to the base station a request for acquiring the third other system information.

Figure 17:
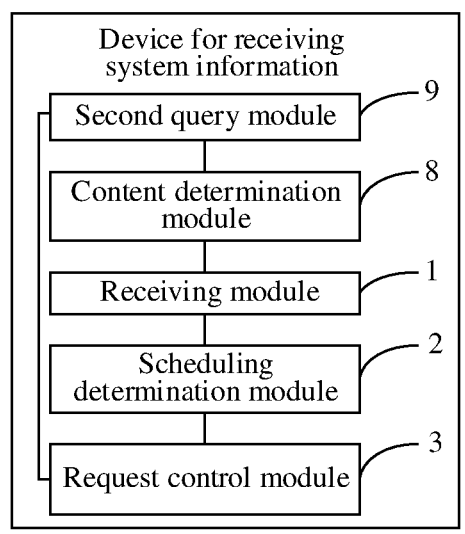
FIG. 17 is a schematic block diagram of still another device for receiving system information according to an exemplary embodiment.

FIG. 17 is a schematic block diagram of still another device for receiving system information according to an exemplary embodiment. As shown in FIG. 17, based on the embodiment shown in FIG. 13, the minimum system information further includes fourth indication information, and the device further includes:

a content determination module 8, configured to determine whether a content of the first other system information is changed or not according to the fourth indication information; and a second query module 9, configured to, if the content of the first other system information is changed, query whether the changed first other system information has been received or not.

The request control module 3 is further configured to, in case that the changed first other system information is not received, send a request for acquiring the changed first other system information to the base station.

Figure 18:
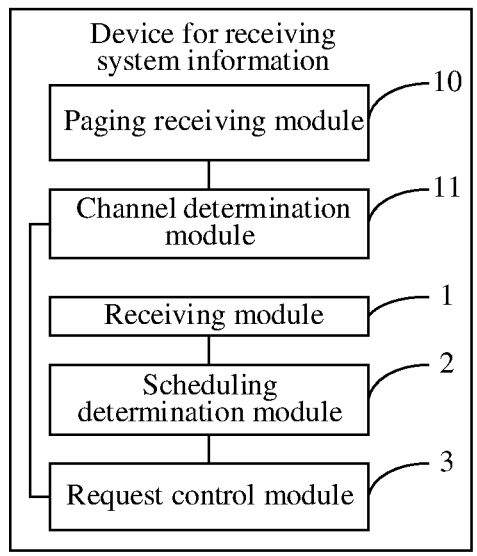
FIG. 18 is a schematic block diagram of still another device for receiving system information according to an exemplary embodiment.

FIG. 18 is a schematic block diagram of still another device for receiving system information according to an exemplary embodiment. As shown in FIG. 18, based on the embodiment shown in FIG. 13, the device for receiving system information further includes:

a paging receiving module 10, configured to, in the process of requesting the first other system information of the other system information from the base station, receive paging information, the paging information including fifth indication information; and a channel determination module 11, configured to determine whether a preamble of a PRACH and/or resource configuration information of the PRACH corresponding to the first other system information are/is changed or not according to the fifth indication information.

The request control module 3 is further configured to, in case that the preamble of the PRACH and/or the resource configuration information of the PRACH corresponding to the first other system information are/is changed, request the base station for the first other system information according to the changed preamble of the PRACH and/or the changed resource configuration information of the PRACH.

Figure 19:
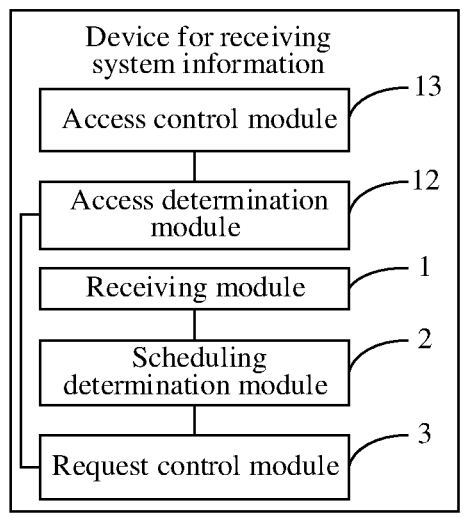
FIG. 19 is a schematic block diagram of still another device for receiving system information according to an exemplary embodiment.

FIG. 19 is a schematic block diagram of still another device for receiving system information according to an exemplary embodiment. As shown in FIG. 19, based on the embodiment shown in FIG. 13, the device for receiving system information further includes:

an access determination module 12, configured to, in the process of requesting the first other system information of the other system information from the base station or in the process of receiving the first other system information, if paging information is received or network access instruction information exists in NAS information, stop the process of requesting the first other system information or the process of receiving the first other system information; and an access control module 13, configured to initiate a network access procedure according to the network access instruction information.

Figure 20:
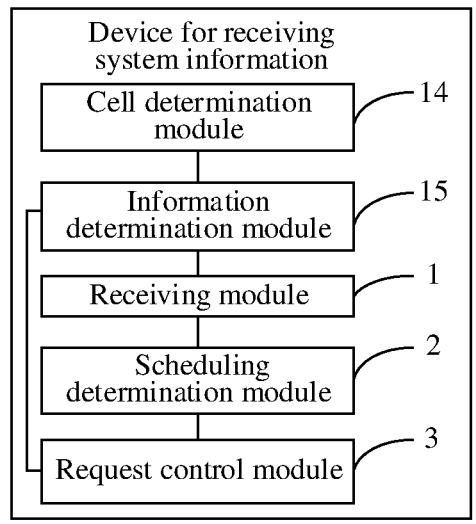
FIG. 20 is a schematic block diagram of still another device for receiving system information according to an exemplary embodiment.

FIG. 20 is a schematic block diagram of still another device for receiving system information according to an exemplary embodiment. As shown in FIG. 20, based on the embodiment shown in FIG. 13, the receiving module is further configured to receive the first other system information within the time window when the first other system information is transmitted, and the device for receiving system information further includes:

an information determination module 14, configured to, if the first other system information is not received within a preset number of successive time windows, determine whether the first other system information is essential information of the other system information or not; and a cell determination module 15, configured to, if the first other system information is essential information of the other system information, determine that a cell corresponding to the base station is disabled.

The request control module 3 is further configured to, in case that the first other system information is unessential information of the other system information, resend to the base station a request for acquiring the first other system information, or establish a communication connection with the base station to acquire the first other system information.

Figure 21:
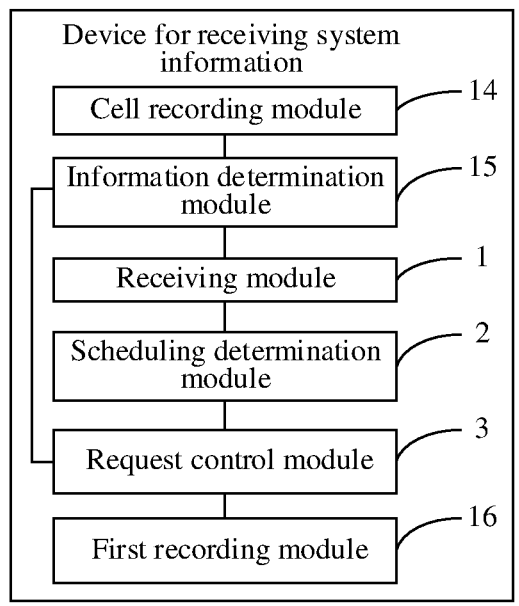
FIG. 21 is a schematic block diagram of still another device for receiving system information according to an exemplary embodiment.

FIG. 21 is a schematic block diagram of still another device for receiving system information according to an exemplary embodiment. As shown in FIG. 21, based on the embodiment shown in FIG. 20, the device for receiving system information further includes:

a first recording module 16, configured to record a number of times for which the first other system information is re-requested from the base station.

The request control module 3 is further configured to, in case that the number of times is higher than a first preset number of times, stop re-requesting the first other system information and establish the communication connection with the base station to acquire the first other system information.

Figure 22:
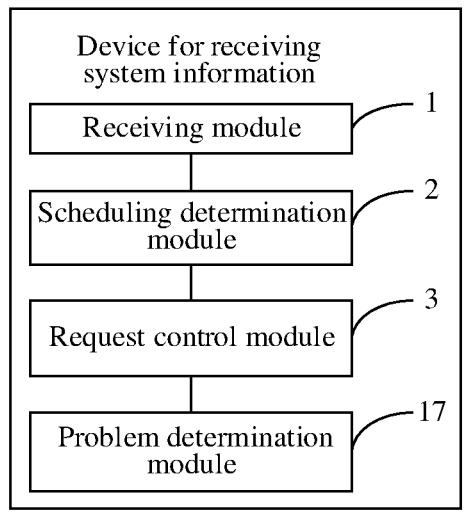
FIG. 22 is a schematic block diagram of still another device for receiving system information according to an exemplary embodiment.

FIG. 22 is a schematic block diagram of still another device for receiving system information according to an exemplary embodiment. As shown in FIG. 22, based on the embodiment shown in FIG. 13, the device for receiving system information further includes:

a problem determination module 17, configured to, in the process of requesting the first other system information from the base station, if indication information, which is transmitted via a physical layer, about a random access problem is received, end the process of requesting the first other system information and re-request the first other system information from the base station after a preset time.

Figure 23:
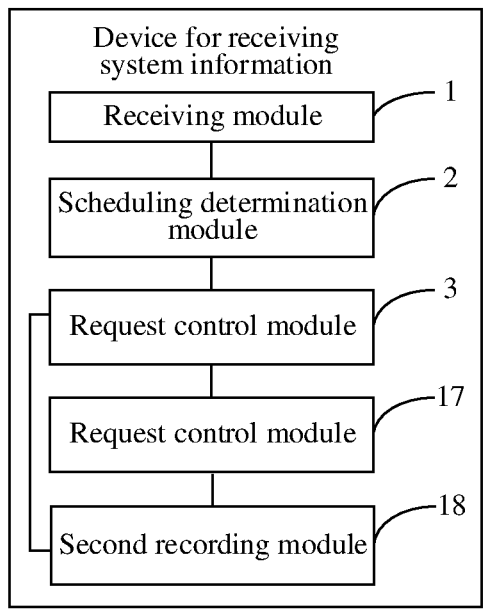
FIG. 23 is a schematic block diagram of still another device for receiving system information according to an exemplary embodiment.

FIG. 23 is a schematic block diagram of still another device for receiving system information according to an exemplary embodiment. As shown in FIG. 23, based on the embodiment shown in FIG. 22, the device for receiving system information further includes:

a second recording module 18, configured to record the number of times for which the first other system information is re-requested from the base station.

The request control module 3 is further configured to, in case that the number of times is higher than a second preset number of times, stop re-requesting the first other system information and establish the communication connection with the base station to acquire the first other system information.

It is to be noted that the preset number, the first preset number of times, the second preset number of times and the preset number may be configured by the base station and may also be predetermined by a system.

With respect to the device in the above embodiments, the specific manners for performing operations for individual modules therein have been described in detail in the embodiment regarding the method, which will not be elaborated herein.

The device embodiments substantially correspond to the method embodiments, and thus related parts refer to part of descriptions of the method embodiments. The device embodiments described above are only schematic, modules described as separate parts therein may be or may not be physically separated, and parts displayed as modules may be or may not be physical modules, and namely may be located in the same place or may also be distributed to multiple network modules. Part or all of the modules therein may be selected according to a practical requirement to achieve the purpose of the solutions of the present disclosure. Those of ordinary skill in the art may understand and implement without creative work.

Correspondingly, the present disclosure also provides a device for receiving system information, which includes: a processor; and a memory configured to store an instruction executable for the processor. The processor is configured to:

receive minimum system information transmitted by a base station, the minimum system information including first indication information;

determine a scheduling state of first other system information of other system information according to the first indication information, the first other system information being transmitted in an on-demand manner; and in a process of requesting the first other system information from the base station, if all information of the first other system information is changed from being scheduled to not being scheduled, end the process of requesting the first other system information; or if part of the first other system information is changed from being scheduled to not being scheduled,
 end the process of requesting the first other system information, and send to the base station a request for acquiring part of information, that is still scheduled, of the first other system information, or
 continue the process of requesting the first other system information and send, after the process of requesting the first other system information is finished, to the base station the request for acquiring part of information, that is still scheduled, of the first other system information.

Correspondingly, the present disclosure also provides a terminal, which includes a memory and one or more than one program. The one or more than one program is stored in the memory and configured to be executed by one or more than one processor. The one or more than one program includes instructions configured to execute the following operations:

minimum system information transmitted by a base station is received, the minimum system information including first indication information;

a scheduling state of first other system information of other system information according is determined according to the first indication information, the first other system information being transmitted in an on-demand manner; and in a process of requesting the first other system information from the base station, if all information of the first other system information is changed from being scheduled to not being scheduled, the process of requesting the first other system information is ended, or if part of the first other system information is changed from being scheduled to not being scheduled,
 the process of requesting the first other system information is ended and a request for acquiring part of information, that is still scheduled, of the first other system information is sent to the base station, or
 the process of requesting the first other system information is continued, and a request for acquiring part of information, that is still scheduled, of the first other system information is sent to the base station after the process of requesting the first other system information is finished.

Figure 24:
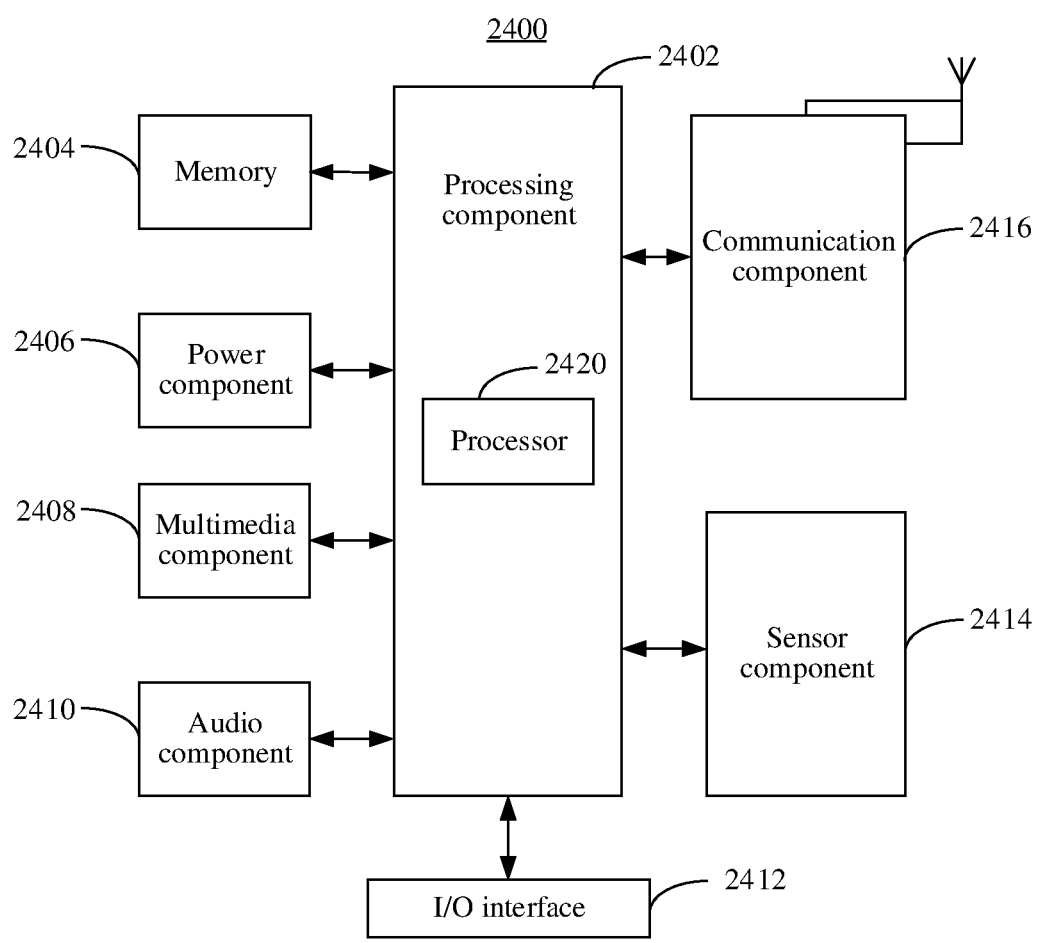
FIG. 24 is structure diagram of a device for receiving system information according to an exemplary embodiment.

FIG. 24 is block diagram of a device for receiving system information 2400 according to an exemplary embodiment. For example, the device 2400 may be a mobile phone, a computer, a digital broadcast terminal, a messaging device, a gaming console, a tablet, a medical device, exercise equipment, a personal digital assistant and the like.

Referring to FIG. 24, the device 2400 may include one or more of the following components: a processing component 2402, a memory 2404, a power component 2406, a multimedia component 2408, an audio component 2410, an Input/Output (I/O) interface 2412, a sensor component 2414, and a communication component 2416.

The processing component 2402 typically controls overall operations of the device 2400, such as the operations associated with display, telephone calls, data communications, camera operations, and recording operations. The processing component 2402 may include one or more processors 2420 to execute instructions to perform all or part of the steps in the abovementioned method. Moreover, the processing component 2402 may include one or more modules which facilitate interaction between the processing component 2402 and the other components. For instance, the processing component 2402 may include a multimedia module to facilitate interaction between the multimedia component 2408 and the processing component 2402.

The memory 2404 is configured to store various types of data to support the operation of the device 2400. Examples of such data include instructions for any application programs or methods operated on the device 2400, contact data, phonebook data, messages, pictures, video, etc. The memory 2404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 2406 provides power for various components of the device 2400. The power component 2406 may include a power management system, one or more power supplies, and other components associated with generation, management and distribution of power for the device 2400.

The multimedia component 2408 includes a screen providing an output interface between the device 2400 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 2408 includes a front camera and/or a rear camera. The front camera and/or the rear camera may receive external multimedia data when the device 2400 is in an operation mode, such as a photographing mode or a video mode. Each of the front camera and the rear camera may be a fixed optical lens system or have focusing and optical zooming capabilities.

The audio component 2410 is configured to output and/or input an audio signal. For example, the audio component 2410 includes a Microphone (MIC), and the MIC is configured to receive an external audio signal when the device 2400 is in the operation mode, such as a call mode, a recording mode and a voice recognition mode. The received audio signal may further be stored in the memory 2404 or sent through the communication component 2416. In some embodiments, the audio component 2410 further includes a speaker configured to output the audio signal.

The I/O interface 2412 provides an interface between the processing component 2402 and a peripheral interface module, and the peripheral interface module may be a keyboard, a click wheel, buttons and the like. The buttons may include, but not limited to: a home button, a volume button, a starting button and a locking button.

The sensor component 2414 includes one or more sensors configured to provide status assessment in various aspects for the device 2400. For instance, the sensor component 2414 may detect an on/off status of the device 2400 and relative positioning of components, such as a display and small keyboard of the device 2400, and the sensor component 2414 may further detect a change in a position of the device 2400 or a component of the device 2400, presence or absence of contact between the user and the device 2400, orientation or acceleration/deceleration of the device 2400 and a change in temperature of the device 2400. The sensor component 2414 may include a proximity sensor configured to detect presence of an object nearby without any physical contact. The sensor component 2414 may also include a light sensor, such as a Complementary Metal Oxide Semiconductor (CMOS) or Charge Coupled Device (CCD) image sensor, configured for use in an imaging application. In some embodiments, the sensor component 2414 may also include an acceleration sensor, a gyroscope sensor, a magnetic sensor, a pressure sensor or a temperature sensor.

The communication component 2416 is configured to facilitate wired or wireless communication between the device 2400 and other equipment. The device 2400 may access a communication-standard-based wireless network, such as a Wireless Fidelity (WiFi) network, a 2nd-Generation (2G) or 3rd-Generation (3G) network or a combination thereof. In an exemplary embodiment, the communication component 2416 receives a broadcast signal or broadcast associated information from an external broadcast management system through a broadcast channel. In an exemplary embodiment, the communication component 2416 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 2400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 2404 including an instruction, and the instruction may be executed by the processor 2420 of the device 2400 to implement the abovementioned method. For example, the non-transitory computer-readable storage medium may be a ROM, a RAM, a Compact Disc Read-Only Memory (CD-ROM), a magnetic tape, a floppy disc, an optical data storage device and the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for receiving system information, comprising:
   receiving minimum system information transmitted by a base station, wherein the minimum system information comprises first indication information;
   determining a scheduling state of first other system information of other system information according to the first indication information, wherein the scheduling state includes a state of being scheduled or a state of not being scheduled, and the first other system information is transmitted in an on-demand manner; and
   in a process of requesting the first other system information from the base station, when all information of the first other system information is changed from being scheduled to not being scheduled, ending the process of requesting the first other system information; and
when part of the first other system information is changed from being scheduled to not being scheduled,
   ending the process of requesting the first other system information, and sending to the base station a request for acquiring part of information, that is still scheduled, of the first other system information; or
   continuing the process of requesting the first other system information and sending, after the process of requesting the first other system information is finished, to the base station a request for acquiring part of information, that is still scheduled, of the first other system information.

2. The method of claim 1, further comprising:
in a process of receiving the first other system information,
when all the information of the first other system information is changed from being scheduled to not being scheduled, stopping receiving the first other system information; and
when part of the first other system information is changed from being scheduled to not being scheduled, receiving part of the first other system information that is still scheduled.

3. The method of claim 1, wherein the minimum system information further comprises second indication information, and the method further comprises:
determining whether the first other system information is in a transmitted state or not according to the second indication information; and
in the process of requesting the first other system information of the other system information from the base station,
when all of the first other system information is in the transmitted state, ending the process of requesting the first other system information, and receiving the first other system information within a time window when the first other system information is transmitted, and
when part of the first other system information is in the transmitted state,
   ending the process of requesting the first other system information, and sending to the base station a request for acquiring part of information in an un-transmitted state; or
   continuing the process of requesting the first other system information and sending, after the process of requesting the first other system information is finished, to the base station a request for acquiring part of the first other system information in the un-transmitted state.

4. The method of claim 1, wherein the minimum system information further comprises third indication information, and the method further comprises:
determining, according to the third indication information, whether the on-demand transmission manner is changed to a broadcast transmission manner for the first other system information or not, and whether second other system information for which the broadcast transmission manner is changed to the on-demand transmission manner exists in the other system information or not;
when the on-demand transmission manner is changed to the broadcast transmission manner for the first other system information, receiving the first other system information within a time window when the first other system information is transmitted in the broadcast transmission manner;
when the second other system information for which the broadcast transmission manner is changed to the on-demand transmission manner exists, querying whether the second other system information has been received or not; and
when no second other system information is received, sending to the base station a request for acquiring the second other system information.

5. The method of claim 4, further comprising:
in the process of requesting the first other system information of the other system information from the base station, when it is determined according to the first indication information that third other system information of the other system information is changed from not being scheduled to being scheduled, determining a transmission manner for the third other system information according to the third indication information; and
when the transmission manner for the third other system information is the on-demand manner,
   ending the process of requesting the first other system information, and sending to the base station a request for acquiring the first other system information and the third other system information; or
   continuing the process of requesting the first other system information and sending, after the process of requesting the first other system information is finished, to the base station a request for acquiring the third other system information.

6. The method of claim 1, wherein the minimum system information further comprises fourth indication information, and the method further comprises:
determining whether a content of the first other system information is changed or not according to the fourth indication information;
when the content of the first other system information is changed, querying whether the changed first other system information has been received or not; and
when no changed first other system information is received, sending to the base station a request for acquiring the changed first other system information.

7. The method of claim 1, further comprising:
in the process of requesting the first other system information of the other system information from the base station, receiving paging information, the paging information comprising fifth indication information;
determining, according to the fifth indication information, whether at least one of a preamble of a Physical Random Access Channel (PRACH) or resource configuration information of the PRACH corresponding to the first other system information is changed or not; and
when at least one of the preamble of the PRACH or the resource configuration information of the PRACH corresponding to the first other system information is changed, requesting the first other system information from the base station according to the changed at least one of the preamble of the PRACH or the resource configuration information of the PRACH.

8. The method of claim 1, further comprising:
in the process of requesting the first other system information of the other system information from the base station or in the process of receiving the first other system information, when paging information is received or network access instruction information exists in Non-Access Stratum (NAS) information, stopping the process of requesting the first other system information or the process of receiving the first other system information; and initiating a network access procedure according to the network access instruction information.

9. The method of claim 1, further comprising:

receiving the first other system information within the time window when the first other system information is transmitted;

when no first other system information is received within a preset number of successive time windows, determining whether the first other system information is essential information of the other system information or not; and when the first other system information is essential information of the other system information, determining that a cell corresponding to the base station is disabled; and when the first other system information is unessential information of the other system information, resending to the base station a request for acquiring the first other system information, or establishing a communication connection with the base station to acquire the first other system information.

10. The method of claim 9, further comprising:

recording a number of times for which the first other system information is re-requested from the base station; and in case that the number of times is higher than a first preset number of times, stopping re-requesting the first other system information, and establishing a communication connection with the base station to acquire the first other system information.

11. The method of claim 1, further comprising:

in the process of requesting the first other system information from the base station, when indication information, which is transmitted via a physical layer, about a random access problem is received, ending the process of requesting the first other system information, and re-requesting the first other system information from the base station after a preset time.

12. The method of claim 11, further comprising:

recording a number of times for which the first other system information is requested from the base station; and in case that the number of times is higher than a second preset number of times, stopping re-requesting the first other system information, and establishing a communication connection with the base station to acquire the first other system information.

13. An electronic device, comprising:

a processor; and a memory configured to store an instruction executable for the processor, wherein the processor is configured to:

receive minimum system information transmitted by a base station, wherein the minimum system information comprises first indication information;

determine a scheduling state of first other system information of other system information according to the first indication information, wherein the scheduling state includes a state of being scheduled or a state of not being scheduled, and the first other system information is transmitted in an on-demand manner; and in a process of requesting the first other system information from the base station, when all information of the first other system information is changed from being scheduled to not being scheduled, end the process of requesting the first other system information; and when part of the first other system information is changed from being scheduled to not being scheduled, end the process of requesting the first other system information, and send to the base station a request for acquiring part of information, that is still scheduled, of the first other system information, or continue the process of requesting the first other system information and send, after the process of requesting the first other system information is finished, to the base station a request for acquiring part of information, that is still scheduled, of the first other system information.

14. The device of claim 13, wherein the processor is further configured to:

in a process of receiving the first other system information, when all the information of the first other system information is changed from being scheduled to not being scheduled, stop receiving the first other system information; and when part of the first other system information is changed from being scheduled to not being scheduled, receive part of the first other system information that is still scheduled.

15. The device of claim 13, wherein the minimum system information further comprises second indication information, and the processor is further configured to:

determine whether the first other system information is in a transmitted state or not according to the second indication information; and in the process of requesting the first other system information of the other system information from the base station, when all of the first other system information is in the transmitted state, end the process of requesting the first other system information, and receive the first other system information within a time window when the first other system information is transmitted, and when part of the first other system information is in the transmitted state, end the process of requesting the first other system information, and send to the base station a request for acquiring part of information in an un-transmitted state; or continue the process of requesting the first other system information and send, after the process of requesting the first other system information is finished, to the base station a request for acquiring part of the first other system information in the un-transmitted state.

16. The device of claim 13, wherein the minimum system information further comprises third indication information, and the processor is further configured to:

determine, according to the third indication information, whether the on-demand transmission manner is changed to a broadcast transmission manner for the first other system information or not, and whether second other system information for which the broadcast transmission manner is changed to the on-demand transmission manner exists in the other system information or not;

when the on-demand transmission manner is changed to the broadcast transmission manner for the first other system information, receive the first other system information within a time window when the first other system information is transmitted in the broadcast transmission manner;

when the second other system information for which the broadcast transmission manner is changed to the on-demand transmission manner exists, query whether the second other system information has been received or not; and when no second other system information is received, send to the base station a request for acquiring the second other system information.

17. The device of claim 16, wherein the processor is further configured to:

in the process of requesting the first other system information of the other system information from the base station, when it is determined according to the first indication information that third other system information of the other system information is changed from not being scheduled to being scheduled, determine a transmission manner for the third other system information according to the third indication information; and when the transmission manner for the third other system information is the on-demand manner,
end the process of requesting the first other system information, and send to the base station a request for acquiring the first other system information and the third other system information; or
continue the process of requesting the first other system information and send, after the process of requesting the first other system information is finished, to the base station a request for acquiring the third other system information.

18. The device of claim 13, wherein the minimum system information further comprises fourth indication information, and the processor is further configured to:

determine whether a content of the first other system information is changed or not according to the fourth indication information;

when the content of the first other system information is changed, query whether the changed first other system information has been received or not; and when no changed first other system information is received, send to the base station a request for acquiring the changed first other system information.

19. The device of claim 13, wherein the processor is further configured to:

in the process of requesting the first other system information of the other system information from the base station, receive paging information, the paging information comprising fifth indication information;

determine, according to the fifth indication information, whether at least one of a preamble of a Physical Random Access Channel (PRACH) or resource configuration information of the PRACH corresponding to the first other system information is changed or not; and when at least one of the preamble of the PRACH or the resource configuration information of the PRACH corresponding to the first other system information is changed, request the first other system information from the base station according to the changed at least one of the preamble of the PRACH or the resource configuration information of the PRACH.

20. The device of claim 13, wherein the processor is further configured to:

in the process of requesting the first other system information of the other system information from the base station or in the process of receiving the first other system information, when paging information is received or network access instruction information exists in Non-Access Stratum (NAS) information, stop the process of requesting the first other system information or the process of receiving the first other system information; and initiate a network access procedure according to the network access instruction information.

* * * * *